(12) United States Patent
Martinez et al.

(10) Patent No.: US 6,411,703 B1
(45) Date of Patent: *Jun. 25, 2002

(54) GEOGRAPHICALLY DISTRIBUTED TELEPHONY

(75) Inventors: Edgar Martinez; Locillo Giuseppe Pino, both of Ottawa; Charles Richard Wiebe, Stittsville, all of (CA)

(73) Assignee: Nortel Networks Limited, St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/020,444

(22) Filed: Feb. 9, 1998

Related U.S. Application Data

(62) Division of application No. 08/534,668, filed on Sep. 27, 1997, now Pat. No. 5,867,569.

(51) Int. Cl.[7] .................................................. H04M 7/00
(52) U.S. Cl. ........................ 379/221.13; 379/201.01; 379/210.01; 379/211.01; 379/212.01; 379/219; 379/220.01; 379/221.01; 379/229; 379/272; 379/273
(58) Field of Search ................................. 379/201, 207, 379/210, 211, 213, 220, 221, 229, 230, 219, 242, 272, 273, 221.13

(56) References Cited

U.S. PATENT DOCUMENTS

| | | | |
|---|---|---|---|
| 4,754,479 A | | 6/1988 | Bicknell et al. |
| 5,048,081 A | | 9/1991 | Gavaras et al. |
| 5,237,604 A | | 8/1993 | Ryan |
| 5,255,315 A | | 10/1993 | Bushnell |
| 5,377,186 A | * | 12/1994 | Wegner et al. ............. 370/220 |
| 5,440,626 A | | 8/1995 | Boyle et al. |
| 5,454,034 A | | 9/1995 | Martin |
| 5,602,909 A | | 2/1997 | Carkner et al. |

* cited by examiner

*Primary Examiner*—Harry S. Hong
*Assistant Examiner*—Bing Bui

(57) ABSTRACT

Method and system are provided for efficient telephone number portability within a geographically dispersed telephony and the like switching system, wherein ported telephone numbers, when dialled and found non-existent at their number-inherent destination, a "Release Treatment" with a trigger (automatic flexible routing) searches in a database from the originating switching node or office, whereupon their new network node address is directly connected to following normal routing procedures; thus permitting realistically affordable telephone number portability, particularly local number portability (LNP).

15 Claims, 21 Drawing Sheets

GEOGRAPHICALLY DISTRIBUTED TELEPHONY

This application is a division of U.S. 08/534,668, filed Sep. 27, 1995, now U.S. Pat. No 5,867,569.

BACKGROUND OF THE INVENTION

1. Field of the Invention

The present invention relates to telephony systems in general, and to telephony systems utilizing what is now known as intelligent networking within such systems. More particularly, it relates to telephony switching systems with enhanced switch call processing capabilities, such as those capable of supporting "call forwarding" and the like services. More particularly still, the present invention provides methods and apparatus for providing telephone number portability. In the preferred implementation of the improved method of operating a telephony switching system, novel look-ahead call routing is utilized.

2. Related Art

Today, most services are resident in the software in each central office switch. While this has allowed providers to deliver a vast array of features, it also means that providers must depend on vendors to develop new features and then must often coordinate the development of these features among the several switch vendors that they buy equipment from. When the features are available, they must then be loaded into each individual switch in the network, a complex task for networks that may contain hundreds of central offices.

As competition intensifies between providers of telephony services, providers are looking for three key competitive advantages:

- They want to be able to rapidly develop customized features to differentiate their offering in the marketplace.
- They want to be able to quickly deploy new features ubiquitously throughout their serving areas as cost-effectively as possible.
- They want to put certain processing-intensive or network-based (as opposed to switch-based) services such as local number portability and PCS (Personal Communications Services) into centralized databases that all network switches can access.

Advanced Intelligent Networking (AIN—also know, especially outside of North America, as Intelligent Networking (IN)) is currently being deployed across the United States and Canada to provide these key advantages.

AIN places the intelligence to deliver key features in a centralized network database—called a service control point (SCP) instead of in each individual switch. "Triggers" in the software of individual service switching points (SSPs—central office switches with AIN software) momentarily interrupt call processing and generate queries of the SCP for instructions on how to process features for individual calls.

AIN also provides a standardized service creation environment (SCE) that lets any vendor, including the service provider, develop software for the SCP. Providers can then quickly create (or have other specialized companies create) custom features and load them into the SCP, where they can be immediately accessed and used by any SSP in the network.

New market entrants can either install their own AIN infrastructure, or purchase AIN capabilities from established providers.

Initial AIN features include:

For the Residential Subscriber
- Sophisticated Call Screening and Management Features that allow users to determine who can reach them and when—a call could, for instance, decide to take only long distance calls, or calls from immediate family, during dinner time, or that 900 calls could only be made during the times of the day when the parents are typically at home.
- Enhanced Voice Mail and Messaging Services over the public network.
- Personal Communications Services (PCS) that allow users to receive fully-featured calls any place in the network, wherever they happen to be.

For the Business Subscriber
- Private Virtual Networks that give users cost-effective customized networks using any combination of public and private facilities.
- Virtual Offices that allow users to port business features to a home or cellular telephone as they move about the network.
- Area Number Calling that allows a business to advertise one number throughout an area, but automatically receive calls at the branch nearest to the caller.
- Network and Nodal Automatic Call Distribution available from any central office.
- Telecopier Servers.

As may be seen from the above discussion, one of the most desirable features generally is telephone number portability; but at least local number portability (LNP), that is, number portability within a "local access and transport area" (LATA). Other desirable features involve number portability as applied to personal communications services (PCS); for example, as for cellular telephones.

It has generally been assumed that local number portability would best be provisioned through the use of some type of external database, perhaps similar to that employed for 800 service.

Regarding the point during the call at which the database is queried, it has been suggested that three basic alternatives are present. One alternative is to route the call to the terminating switch to which the NPA/NXX of the dialled number was assigned, the Terminating Access Provider (TAP)—usually the incumbent provider, performing the database query at that point, and based upon the response received back, routing the call to the actual terminating switch of the (new) Terminating Local Service Providers (TLSP). This would require that all calls to ported numbers be routed through the incumbent provider's (TAPs) facilities.

A second alternative is to have the Originating Service Provider (OSP) always perform the database query at the switch from which the call is originated, and based upon the information received back in the response, route the call direct, if possible, to the TLSP.

A third alternative is the so-called "N–1 Alternative", which states that the point at which the database query is launched (and who is responsible for launching it) is determined by the number of carriers involved in the call. If the call is local (or intra-LATA) and involves only two carriers, it is the originating carrier (i.e., OSP) that is responsible for performing the database query. If, however, the call is inter-LATA, involving an Interexchange Carrier (IC), then the intermediate carrier (i.e., IC) must perform the query to obtain final routing instructions. This assumes that the OSP can determine from the dialled NPA/NXX whether the call is local, intra-LATA or inter-LATA. Several carriers view this alternative as limiting location portability to within an NPA or LATA boundary, and as such, is better employed as an interim measure. It does, however, limit the need for OSPs to perform database queries on every originally call.

There has been discussion regarding the composition and format of the database response message which contains the routing information. It has been suggested that a new signalling parameter, Service Providers Identification (SPID) be established to merely identify which TLSP now serves the dialled number, so that the call can be routed to that provider's nearest point-of-presence (POP). It has been suggested that to gain peak network efficiency, the actual terminating switch needs to be identified.

One solution proposes that the bond between customer telephone numbers and network termination addresses be completely broken and interspersed. Under their suggestion, a number dialled to reach a ported number customer (the customer number address—CNA) would first be sent to a database for replacement with a network node address (the NNA), which would be used to route the call to the correct terminating switch/ Since the NNA is in the same format at the CNA (10-digit) and its first six digits uniquely identify the terminating switch (as is the case today) NANP-based routing remains unchanged, yet customers can retain their numbers whenever they move or change providers—the CNA is simply mapped to a new NNA in the database. Since both sets of numbers use the same format, they can be interspersed, i.e., a CNA for one customer can be a NNA for another, and vice versa. It has suggested that the database populate the CNA in the Generic Address Parameter (GAP), and the NNA in the Called Party (cdPN) parameter in its response message. It was also proposed to use a new Originating Line Info (OLI) parameter value to indicate whether a database dip has already been performed in a previous node, to prevent mix-ups of CNAs with NNAs in networks where database queries may be launched at multiple points.

Another solution proposes that rather than substituting NNAs for CNAs, the database merely populates one of the assigned six-digit NPA/NXXs of the actual terminating switch in the cdPN parameter, and moves the actual dialled number to the GAP. Since all network nodes route on the first six digits of the CdPN anyway, the call will progress to the actual terminating switch, which would look at the GAP address, where the dialled number is now located, rather than the CdPN, to determine the actual called line. Although no new signalling parameters are identified with this proposal, switching software modifications, to allow a change in their treatment, are probably required.

Of significant concern with some of the portability solutions identified thus far is the need to perform database queries on all or most originating calls. The additional load on the SS7 signalling network may be such that database deployment options may be severely limited, and/or service degradations such as post dial delay, loss of transmission quality or call blocking may be experienced. One suggestion has been to limit the number of queries needed by nationally "registering" those NPA/NXXs for which numbers have become portable. This would allow carriers to launch database queries only when those prefixes are dialled. Although feasible in the near-term, many feel that once number portability begins to expand, the amount of work required in each switch to trigger on each newly-portable NPA/NXX combination will become overly burdensome. Furthermore, this methodology necessities a waiting period to ensure that all carriers have sufficient time to implement the necessary translations in each end office for each newly-portable prefix.

Absent some methodology to limit the number of queries launched to the portability database(s), the load on the SS7 signalling network may be significant. Although the existing links between the end offices and signalling hub (STP) were sufficient to handle the additional traffic, the number of new links and databases (SCPs) beyond the hub would be substantial. Therefore, if portability was widely offered, a provider's network would only be able to handle the data queries that were generated locally, not those coming in from other areas. The significance of this finding was that calls to ported numbers that originate from outside the ported number area may need to access databases separate from those handling traffic that originates within the area. This implies that unlike the LIDB (calling card database) model, multiple sets of databases, each containing data on the same numbers, may need to be deployed in different areas of the country and state.

SUMMARY OF THE INVENTION

The present invention proposes a simple solution to the general problem of number portability. In a broad aspect of the present invention, an improved method for provided telephone (or the like) number portability comprises the steps of:

i) transmitting from an originating switching office a called telephone number to its inherent switching office destination;

ii) causing said inherent switching office to send back to said originating office a message indicating a ported telephone number; and iii) terminating connection between said originating switching office and said inherent switching office upon completion of step ii).

In another aspect of the present invention, where a ported telephone number message is not possible, the method of the present invention comprises the steps of:

a) transmitting from an originating switching office a called telephone number to its inherent switching office destination;

b) terminating connection between said originating switching office and said inherent switching office upon not being able to establish connection to said called telephone number;

c) causing said originating switching office to request a new switching office location for said called telephone number; and d) causing said originating switching office to establish connection to said new switching office.

In existing switching offices, once the destination (end) switching office has returned to the originating switching office a "Release" message indicating a vacant number, i.e., one that it could not establish connection to because no subscriber is assigned to it, the originating office automatically routes the calling telephone line to an "announcement trunk" specifically associated with the returned cause value. In a more specific aspect of the present invention, the originating switching office must be "forced" to initiate an enquiry as to whether the vacant number release by the end office was due to a ported number, without any disruption to the operating software of the originating switching office. This is accomplished in a simple manner by providing an "announcement trunk" that is constantly "busy" (i.e., a busy dummy trunk), thereby causing the triggering of what is known as "Automatic Flexible Routing" (AFR) at the originating office. This AFR trigger is a feature of Advanced Intelligent Network (AIN) systems which occurs when all routes in the automatic route selection (ARS) pattern are busy. Once the AFR feature is triggered, a database enquiry is initiated, and the database translates the called telephone number (termed CNA for customer name address) into the (physical) network node address (NNA). At the present time, most non-ported CNA numbers are identical to their NNA.

Accordingly, in a further aspect of the present invention, step c), above, comprises the step of providing first a permanently busy trunk to the calling telephone number to cause the originating switching office to initiate a database enquiry for a new switching office location (NNA) for the called telephone number (CNA).

A corresponding novel telephone switching office is characterized by a switching office comprising: a permanently busy non-operational announcement trunk, and database means associating each ported CNA with an NNA.

According to a system aspect of the present invention, a geographically distributed telephony and the like switching system for providing telephone number portability within said switching system while conserving at least transmission facilities between switching nodes of the system, comprising: database means for storing ported telephone numbers and new switching node numbers corresponding thereto; and trigger means at least at one switching node for causing access to said database means for retrieving a new switching node number corresponding to a ported telephone number. The system as defined in claim 1, further comprising: trunk means at said at least one switching node for indicating if connection to said new switching node number entails long distance charges. The system as defined in claim 2, further comprising: trunk means at said at least one switching node for indicating if connection to said new switching node number entails an overseas connection. The system as defined in claim 1, said trigger means comprising a permanently busied announcement trunk adapted to trigger an automatic flexible routing procedure resident in said at least one switching node. The system as defined in any one of claims 1, 2 or 3, further comprising data processing means for inspecting components of said new switching node number to ascertain that connection thereto does not entail long distance charges.

BRIEF DESCRIPTION OF THE DRAWINGS

The preferred embodiments of the present invention will now be described in more detail in conjunction with the annexed drawings, in which:

FIG. 5 is a call flow illustration for implementing LNP using the system of FIG. 3, where the call is forwarded to a wireless telephone (PCS-Set) that is turned on;

FIG. 11 is a schematized representation useful for explaining the method of operation of the system shown in FIG. 3, where the ported number was originally connected to a different switch from the one the calling telephone is connected to;

DETAILED DESCRIPTION OF THE PREFERRED EMBODIMENT

Figure 1:
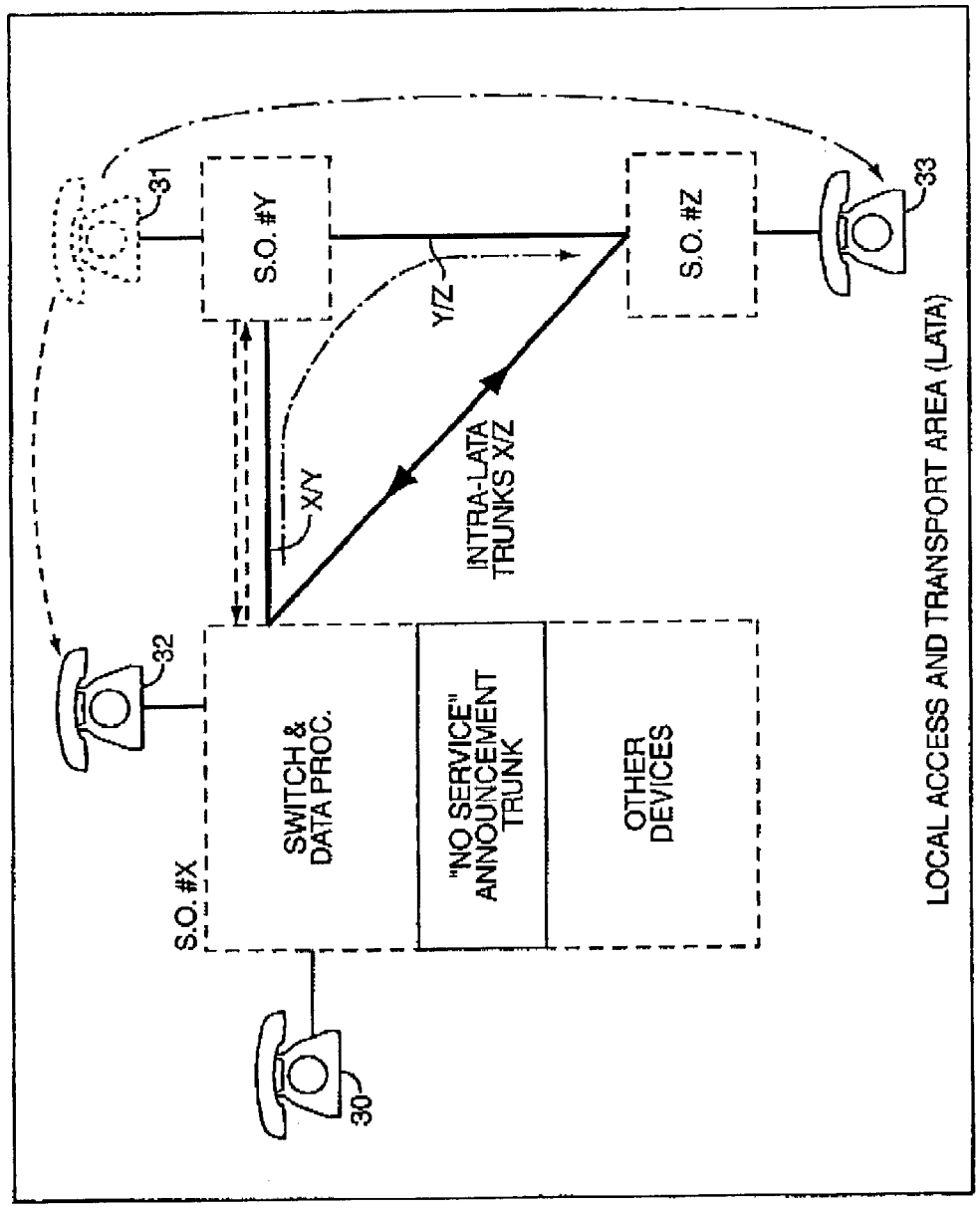
FIG. 1 is an illustration of prior art trunk connections to implement call forwarding to effect local number portability (LNP)

Referring to FIG. 1 of the drawings, it illustrates one of the prior art schemes for effecting a form of local number portability (LNP). This is, of course, the well known call forwarding feature available in present day telephony systems. Illustrated schematically are three switching offices SO #X, SO #Y, and SO #2, located within a local access and transport area (LATA), within which long distance charges do not apply. A subscriber telephone 30 dialling the directory number (known in the art as CNA for "customer name address") of subscriber telephone 31, which has been "call forwarded" to, in the first example telephone 32, and in the second example to telephone 33, will cause the SO #Y itself to dial the number call forwarded to, i.e., that of either telephone 32 or telephone 33. In the first example, two trunk connection circuits (known as "tromboning") in intra-LATA trunks X/Y will be occupied for the duration of the actual telephone call. In the second example, two trunk connection circuits, one on X/Y and one on Y/Z, will be occupied during the actual telephone call. While this wasteful use of transmission trunk (and other) resources may be tolerated for the impermanent call forwarding usages, it would be too wasteful to utilize in the case of permanently ported telephone numbers. Should the dialled telephone directory number (CNA) of the telephone 31 have been simply disconnected, then a "release" message with "vacant cause" would be returned to SO #X from SO #Y, and a "no service" announcement trunk would indicate to the calling telephone 30 that there is no service under this number (the CNA of 31). In the example of FIG. 1, the CNA of a telephone coincides with its physical network node address (NNA), but this, of course, need not be so, as long as there is a data record associating CNAs with NNAs where they are not identical. It is also apparent from FIG. 1, that it would make conserving of system resource, to effect the ultimate connection between the telephones 30 and 32, or 30 and 33, as the case may be, either directly within the SO #X, or via the trunks X/Z, respectively. However, this is not possible within existing systems, whether intra- or inter-LATA, without major expenditure, except within the system and method of the present invention as illustrated in FIG. 3 of the drawings.

Figure 2:
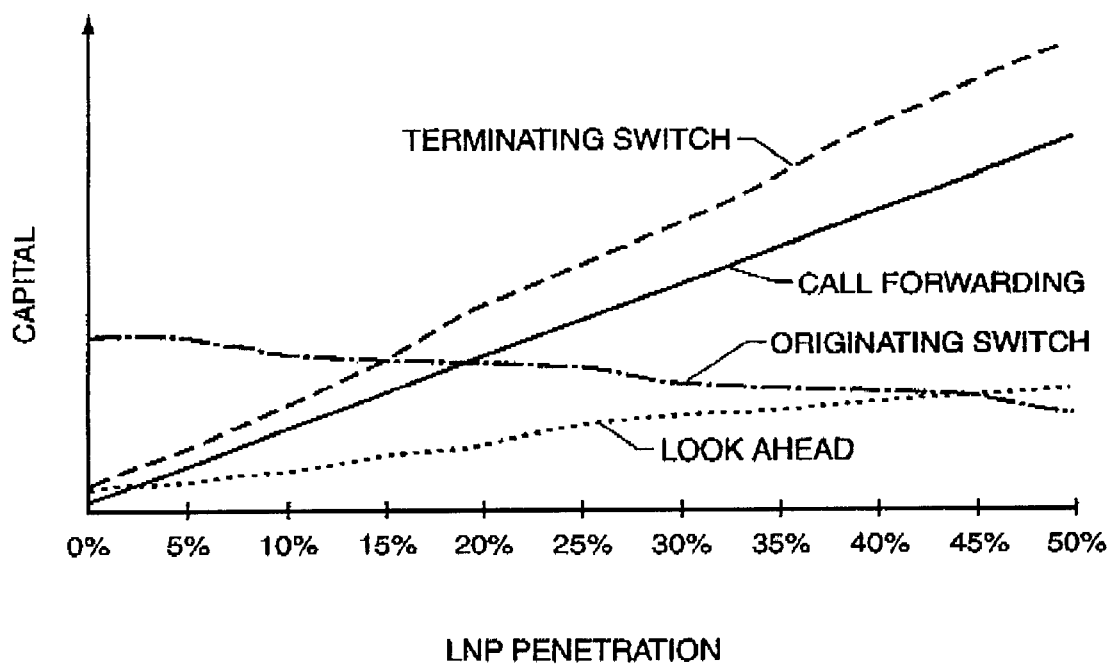
FIG. 2 is a graph comparing capital cost for implementation of LNP using the prior art call forwarding to the capital cost for other methods of implementing LNP, including the look ahead method of the present invention.
Figure 3:
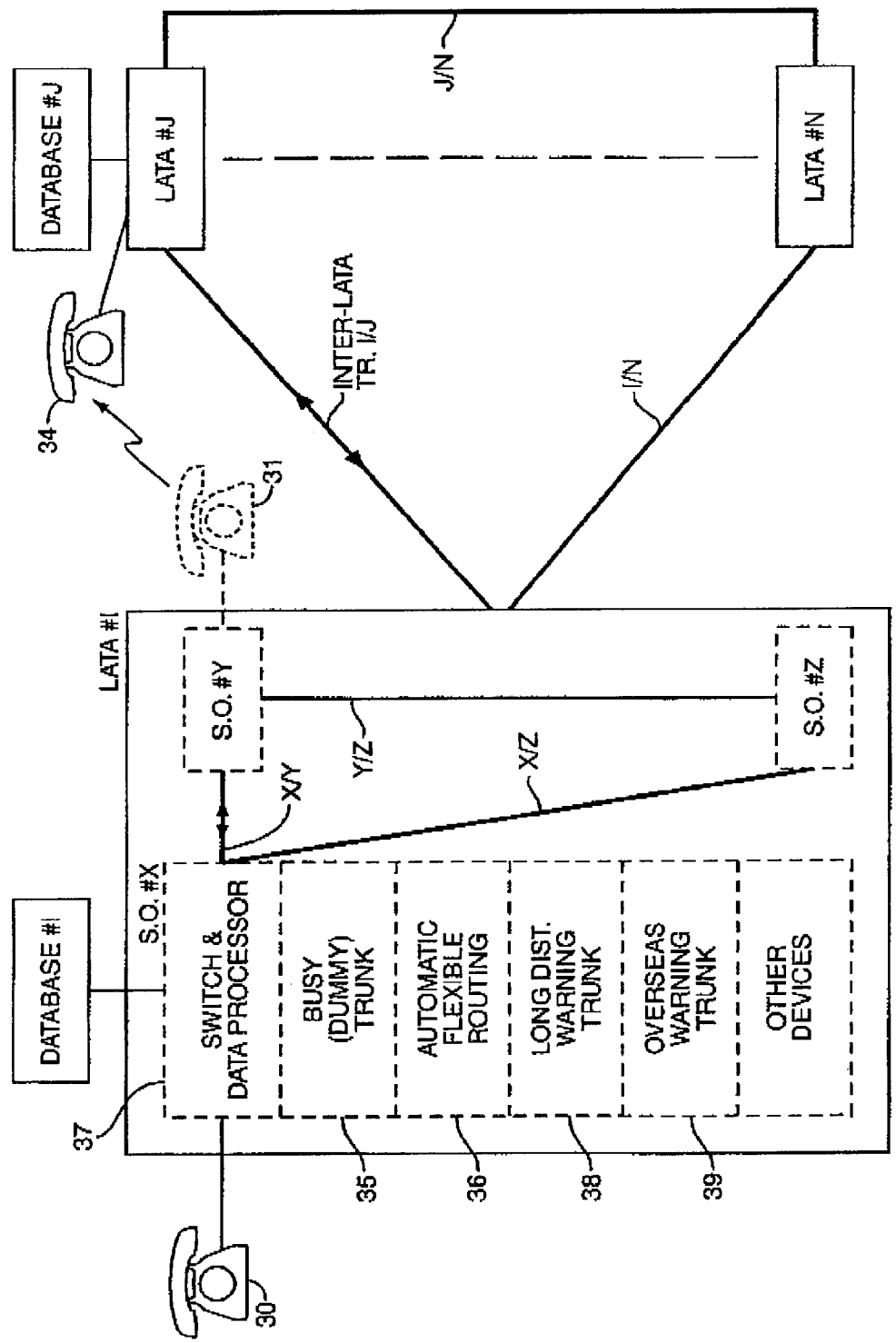
FIG. 3 is a system schematic for implementing the look ahead method to implement number portability according to an embodiment of the present invention.

Before moving to discuss FIG. 3, brief reference is given to the economic comparison between various previously proposed schemes to implement number portability. FIG. 2 shows the relative capital costs of implementing four solutions to number portability as a function of LNP penetration (i.e. within a LATA). The four solutions compared are:

using the intelligent network (IN) facility at the terminating switch (i.e., the SO #Y) to redirect the incoming call;

using the existing call forwarding capability;

using the intelligent network facility at the originating office (i.e., the SO #X) to access a database before any called number is dialled out; and the "look ahead" method of the present invention; "look ahead" refers to the fact that before the routing establishing the actual call is attempted from the SO #X there is a look up of the NNA and a look ahead for the route to it.

Turning now to FIG. 3, it shows a modified SO #X, and a plurality of LATAs; LATA #I, LATA #j to LATA #N. The LATAs would be normally more geographically dispersed than are the switching offices within them. In the figure, an example is shown where the directory number (DN or CNA) dialled by the telephone 30 to the telephone 31 originally attached to the SO #Y has been ported to and is now attached to an SO (not shown) in the LATA #J and shown as telephone 34. As the CNA of the telephone 31 is dialled, the SO #Y returns to the SO #X a "Release" (RLS) message with a "unallocated" cause, which would normally (in existing prior art SOs) an announcement trunk to make a "no service" announcement. However, as shown in FIG. 3 a dummy trunk 35 which is permanently "busied" is provided in the SO #X. The provision of this always busy trunk causes a system routine known as "automatic flexible routing" (AFR) to search for other means of disposing of the call, which triggers, first, a search in database #I associated with the LATA #I. Since the telephone 31 has been ported, the database #I has had entered into it a physical NNA for the telephone 34 at the LATA #J to which the subscriber had moved. Therefore, the SO #X now routes the call initiated by the telephone 30 via the intra-LATA trunks I/J to the LATA #J and within it to the SO to which is designated by the (new) NNA found corresponding to the original CNA in the database #I. This scenario involved inter-LATA trunks, but is equally applicable to intra-LATA portability. Indeed, it is of course desirable that the switch & data process 37 in the SO #X first analyze the NNA to see if connection to it entails long distance charges and announce an appropriate warning to the calling to telephone 30 by means of the long distance warning trunk 38, or even an overseas warning trunk 39, where applicable.

Figure 4:
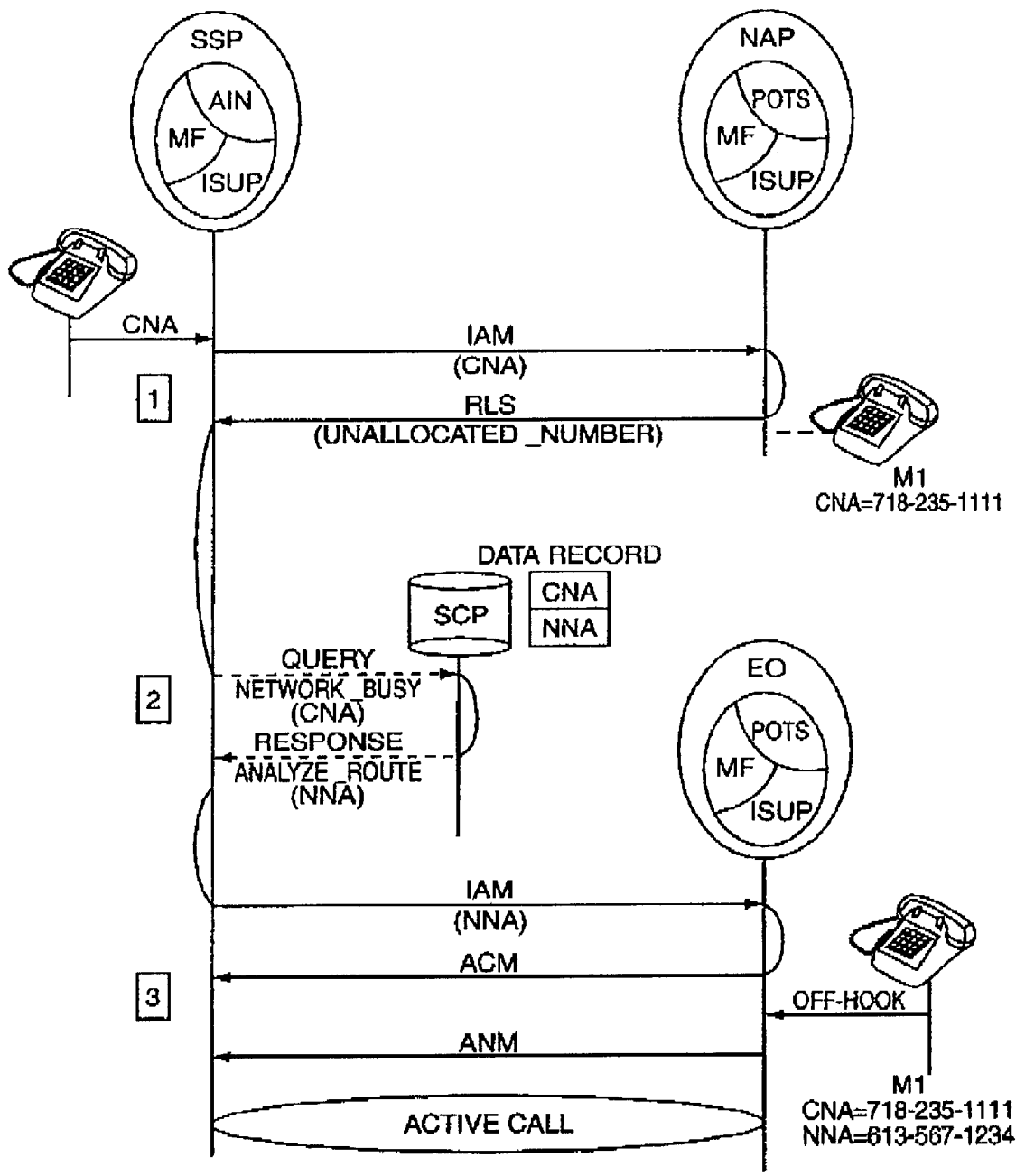
FIG. 4 is a call flow illustration for implementing LNP using the system of FIG. 3, where the ported number is an unallocated number.
Figure 5:
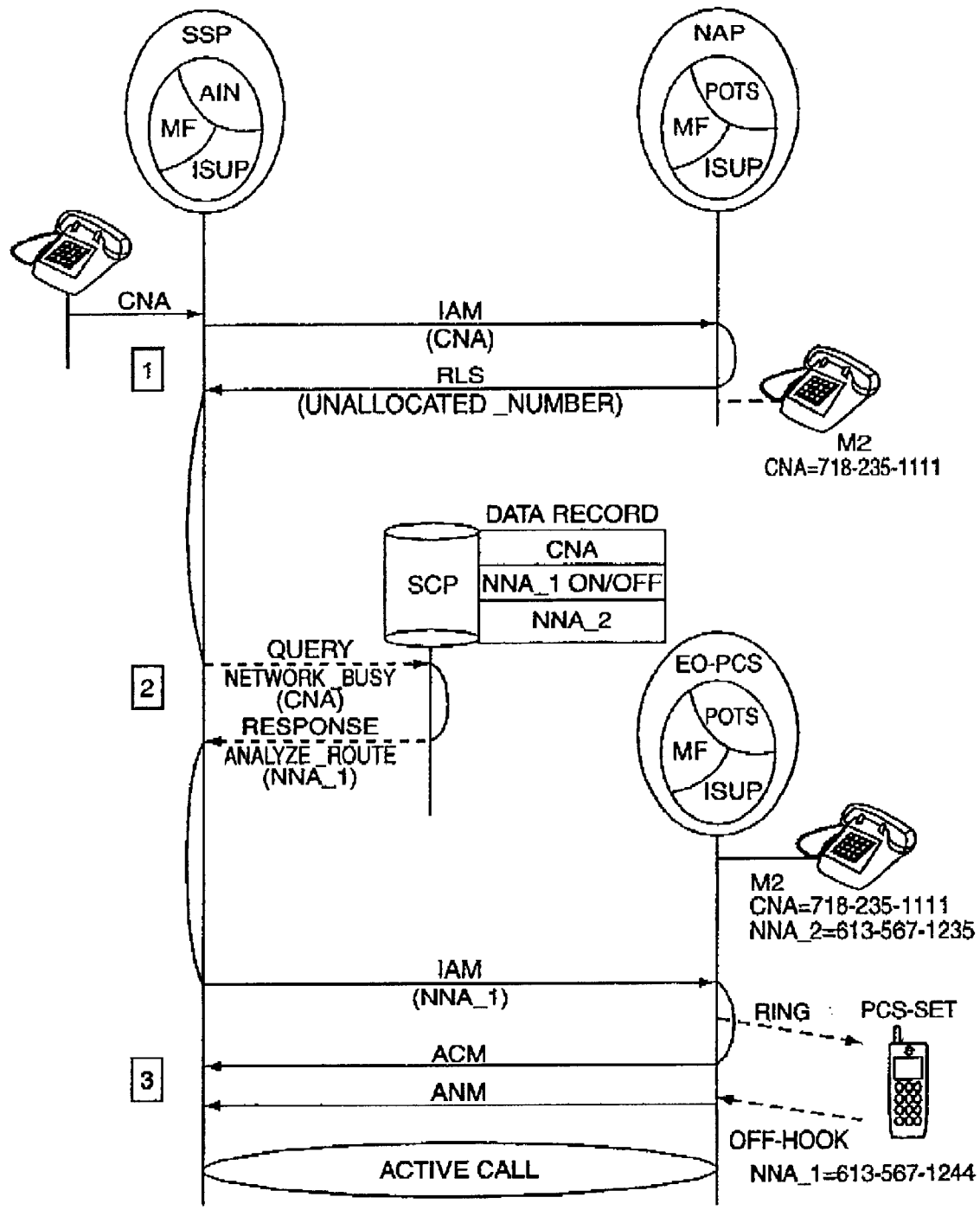
Figure 6:
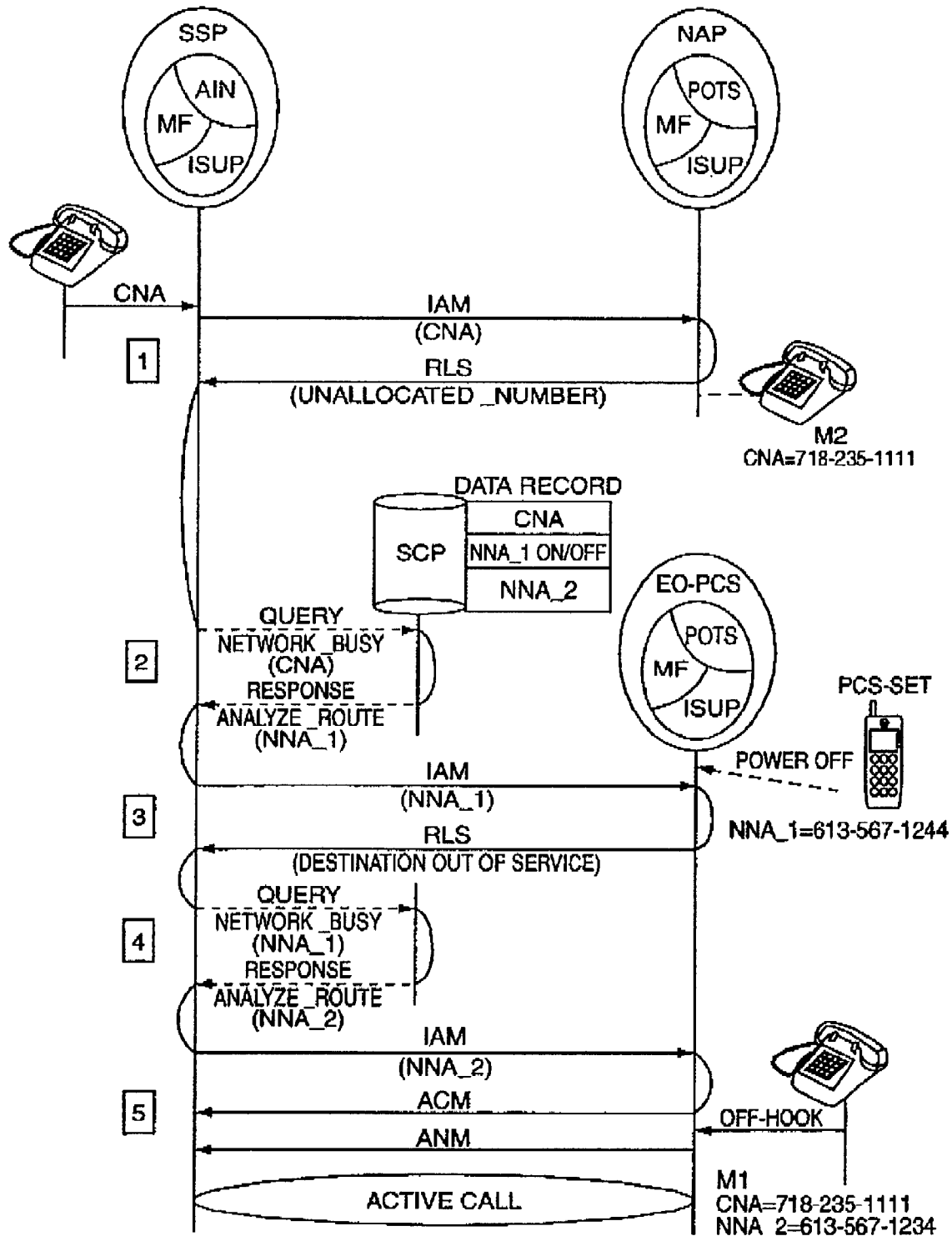
FIG. 6 is a call flow illustration for implementing LNP using the system of FIG. 3, where the wireless telephone (PCS-Set) is turned off.

FIGS. 4 to 6 show what are known in the art as call flow diagrams explains in successive stage 1 to 3 (FIGS. 4 and 5) and 1 to 5 (FIG. 6) the operation of the system shown in FIG. 3 for different applications of the same principle of operation explained above. A glossary for the various acronyms in the figures is given below. These terms pertain to the advanced intelligent network (AIN) and to the integrated system digital network-user port (ISDNUP or ISUP for short).

AIN List of Terms

Trigger

Forms and launches a query to a centralized database to obtain instructions on the processing of a call. Triggers interrupt call processing and alert the switch that further processing instructions are needed to complete the call. When a trigger is encountered by the switch, a query is made to an application service control point (SCP) for additional service logic to complete the call or to implement a function.

Network Access Point (NAP)

An end office that does not support AIN functions, but routes calls for processing using multifrequency or ISUP signalling but is not capable of directly accessing the service control point (SCP) database using CCS7 TCAP messages.

Service Control Point (SCP)

A node in a CCS7 signalling network that supports application databases and service logic. The function of an SCP is to accept a query for information, retrieve the requested information from one of its application databases, and send a response message to the originator of the request.

Service Switching Point (SSP)

A CCS7 signalling node that interacts with the service control point (SCP) to implement special service code features.

Transaction Capability Application Part (TCAP)

A layer of the Common Channel Signalling No. 7 (CCS7) protocol. TCAP provides the services switching point (SSP) to communicate with a service control point.

Automatic Flexible Routing (AFR)

An Advanced Intelligent Network (AIN) R0.1 trigger that occurs when all routes in the automatic route selection (ARS) pattern are busy. Call type is the valid criteria type for this trigger.

Advanced Intelligent Network (AIN)

A set of software feature packages that enhances switch call processing capabilities to use centralized database. These databases determine how AIN calls should proceed for further call processing. AIN also allows operating companies to design and deploy their own features and make these features available across private and public networks.

Access Tandem (AT)

A switching system that provides a traffic concentration and distribution function for traffic originating or terminating within a local access and transport area (LATA). The access tandem provides the inter-LATA carrier with access to more than one end office (EO) within the LATA. The access tandem also acts as a toll tandem for intra-LATA traffic. The access tandem technical functions include automatic message accounting (AMA) recording, routing, and call supervision.

Query

Initiates a Transaction

Response

Indicates Normal Termination of a Transaction

ISUP List of Terms

Initial Address Message (IAM)

A message sent in the forward direction to initiate seizure of an outgoing circuit (trunk) and to transmit number and other information relating to routing and handling of a call.

Address Complete Message (ACM)

A message sent in the backward direction indicating that all the address signals required for routing the call to the called party have been received.

Answer Message (ANM)

A message sent in the backward direction indicating the call has been answered.

Release Message (REL)

A message sent in either direction indicating that the circuit (trunk) identified in the message is being released due to reason (cause) supplied and is ready to be put in idle state.

Figure 7:
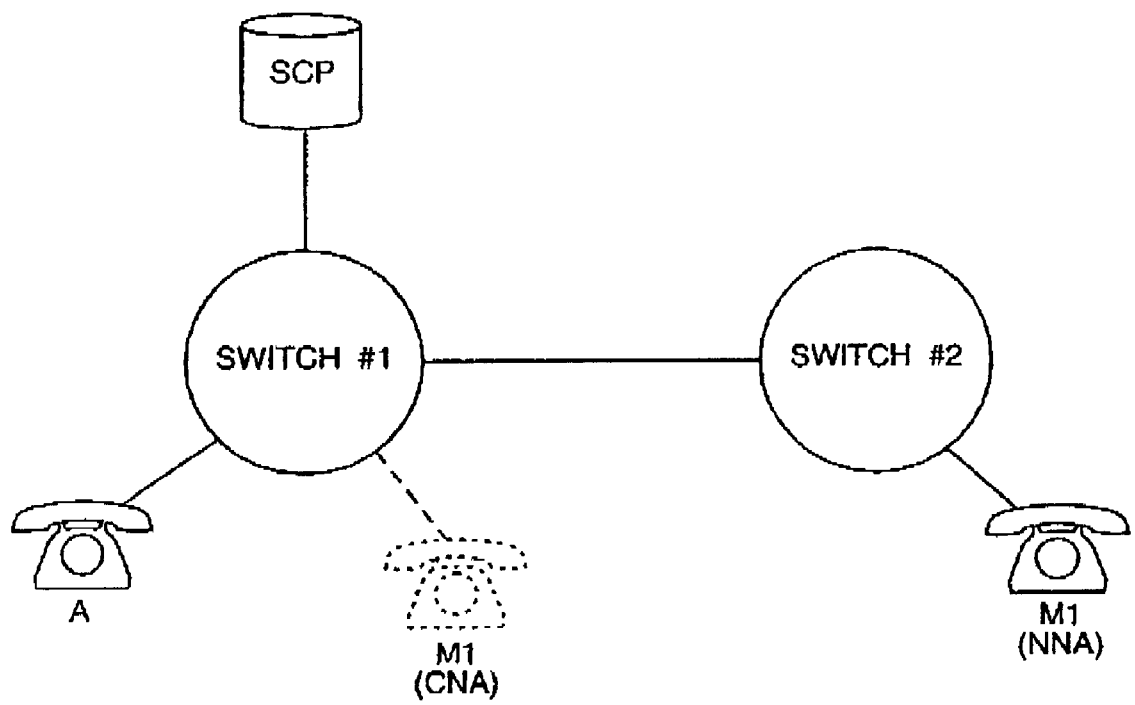
FIG. 7 is a schematized representation useful for explaining the method of operation of the system shown in FIG. 3, where the ported number was originally connected to the same switch as the calling telephone.

Referring now to FIGS. 7 to 10 of the drawings the step-by-step operation of a ported number scenario illustrated in FIG. 7 is given. That scenario envisages a calling telephone A dialling the CNA number of a telephone number of a telephone M1 previously attached to the same switch #1, which also has access to a service control point SCP (which is the centralised network element in the advanced intelligent network (AIN) architecture that individual switches call on to obtain information and commands necessary for completing a telephone call). The ported telephone M1 has moved to switch #2, and now has a new physical network node address NNA.

Figure 8:
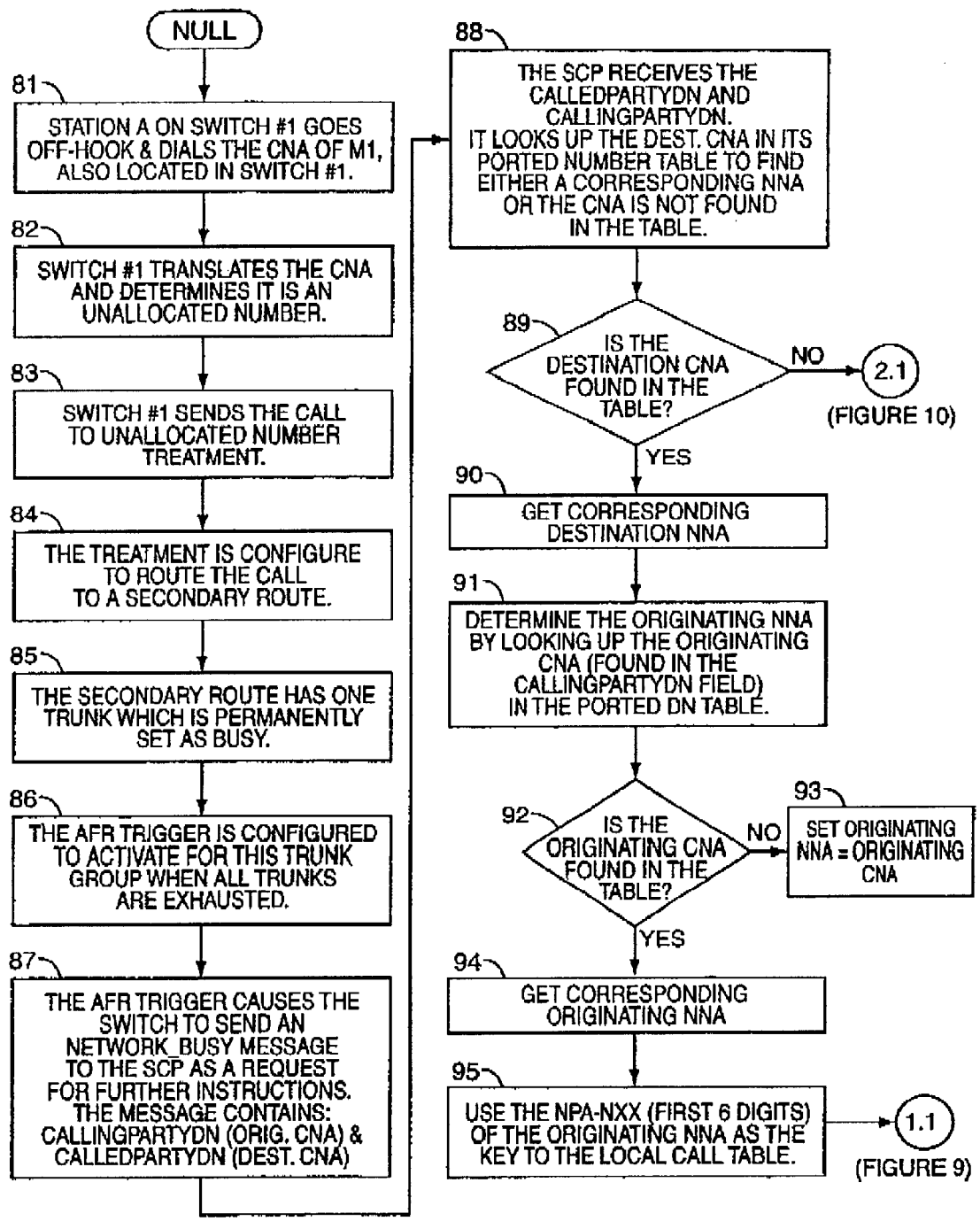
FIGS. 8 to 10 are a flow chart illustrating the steps the system of FIG. 3 implements to effect number portability according to the example shown in FIG. 7.
Figure 9:
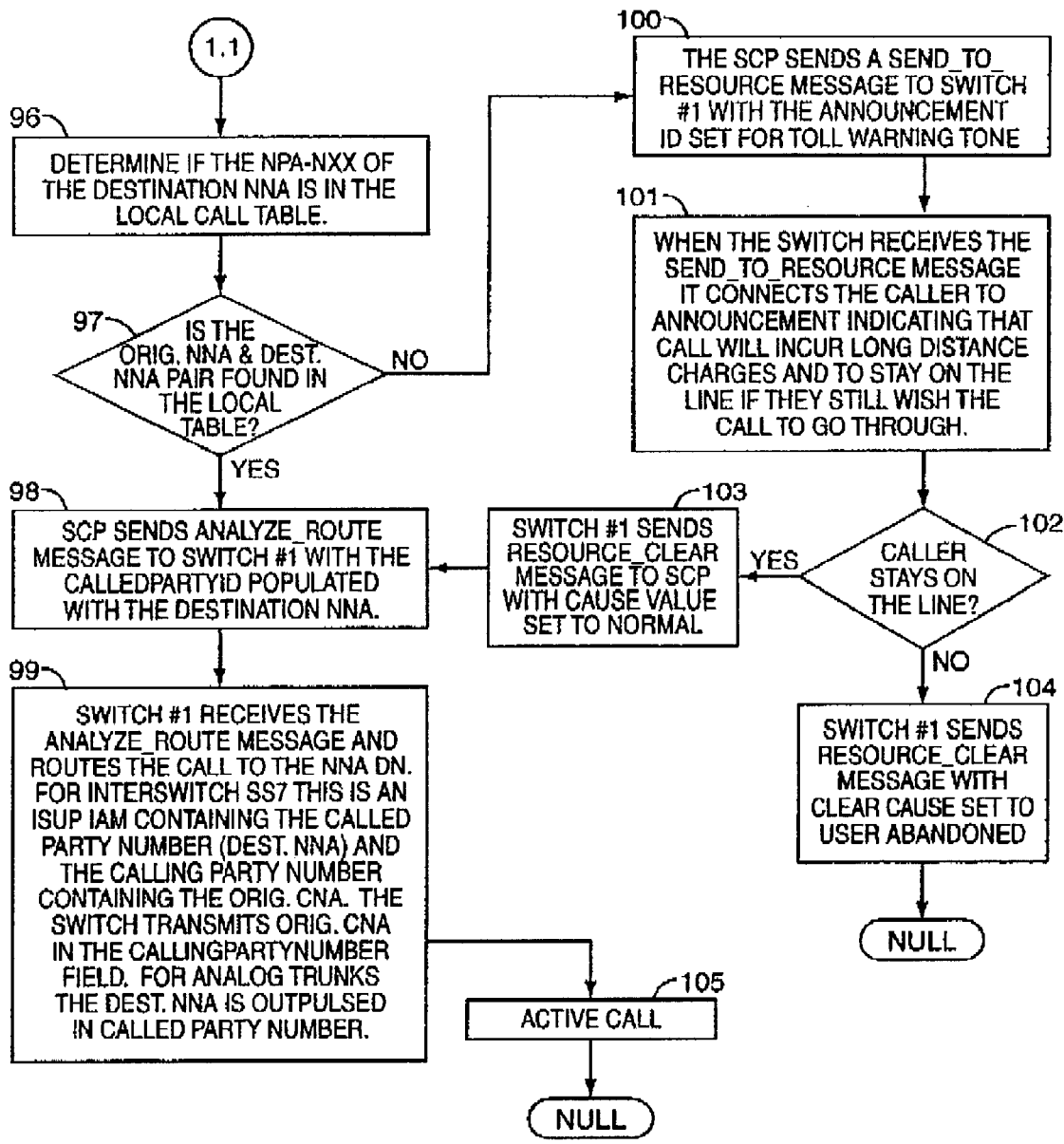
Figure 10:
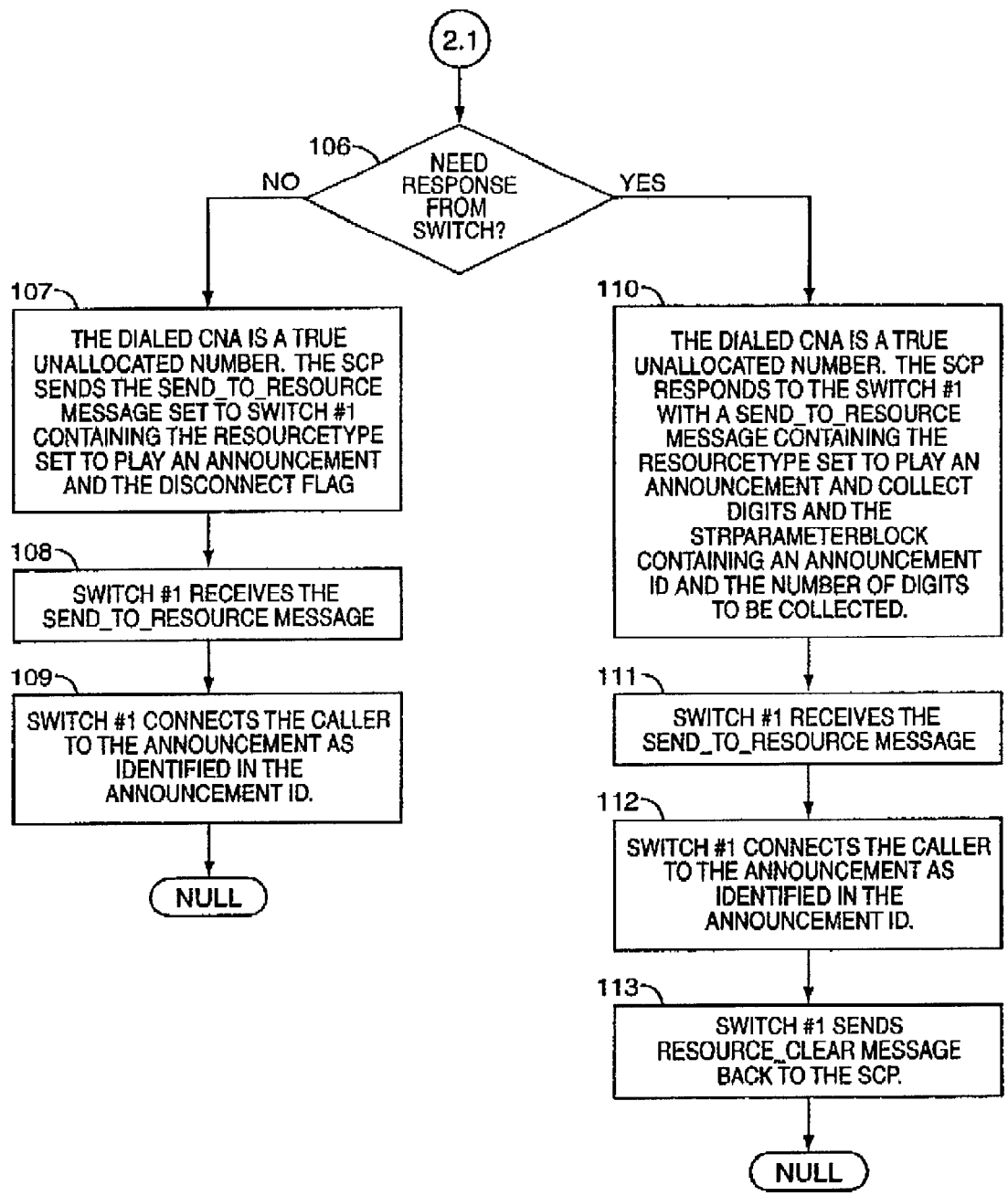
Figure 11:
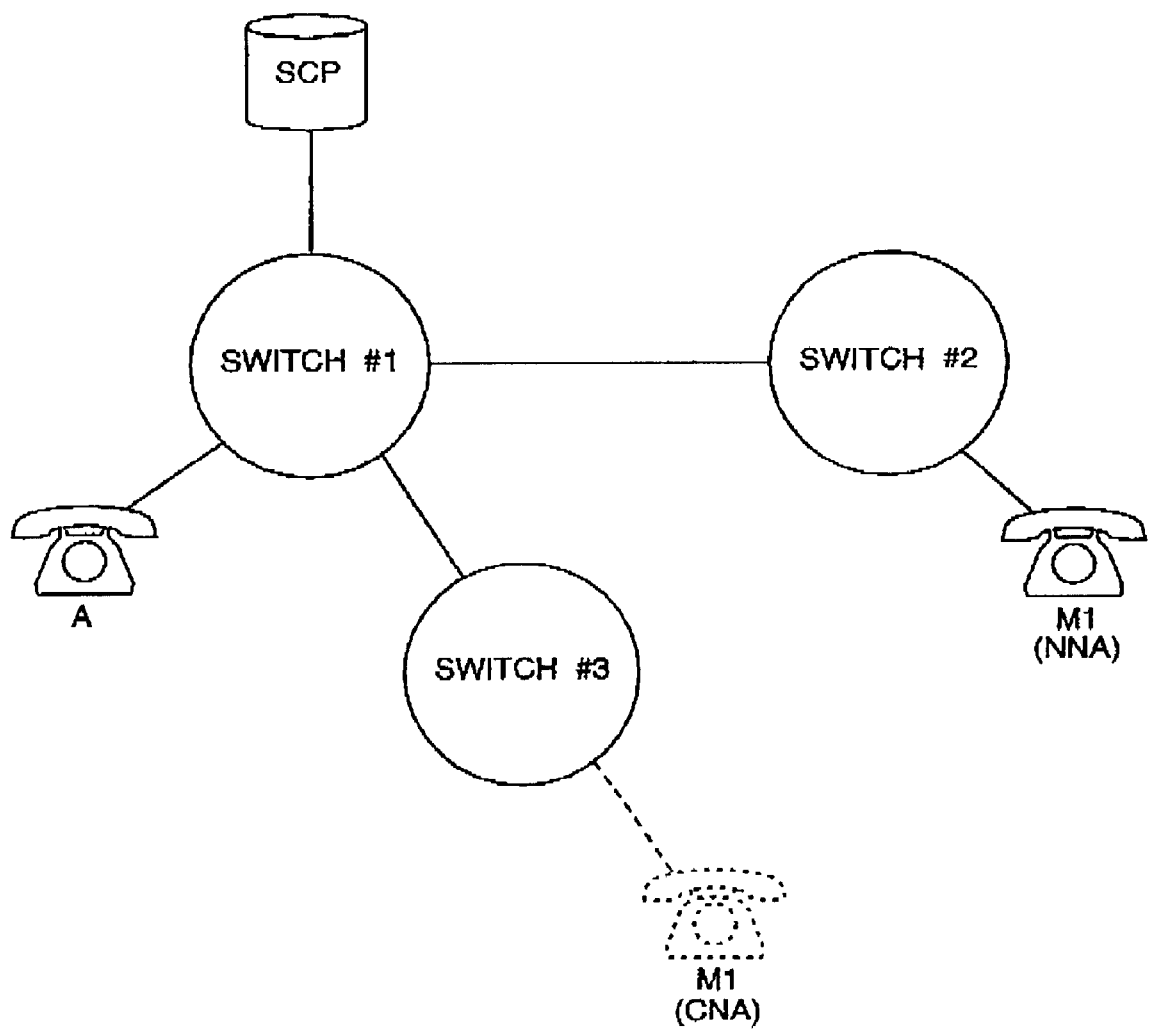
Figure 12:
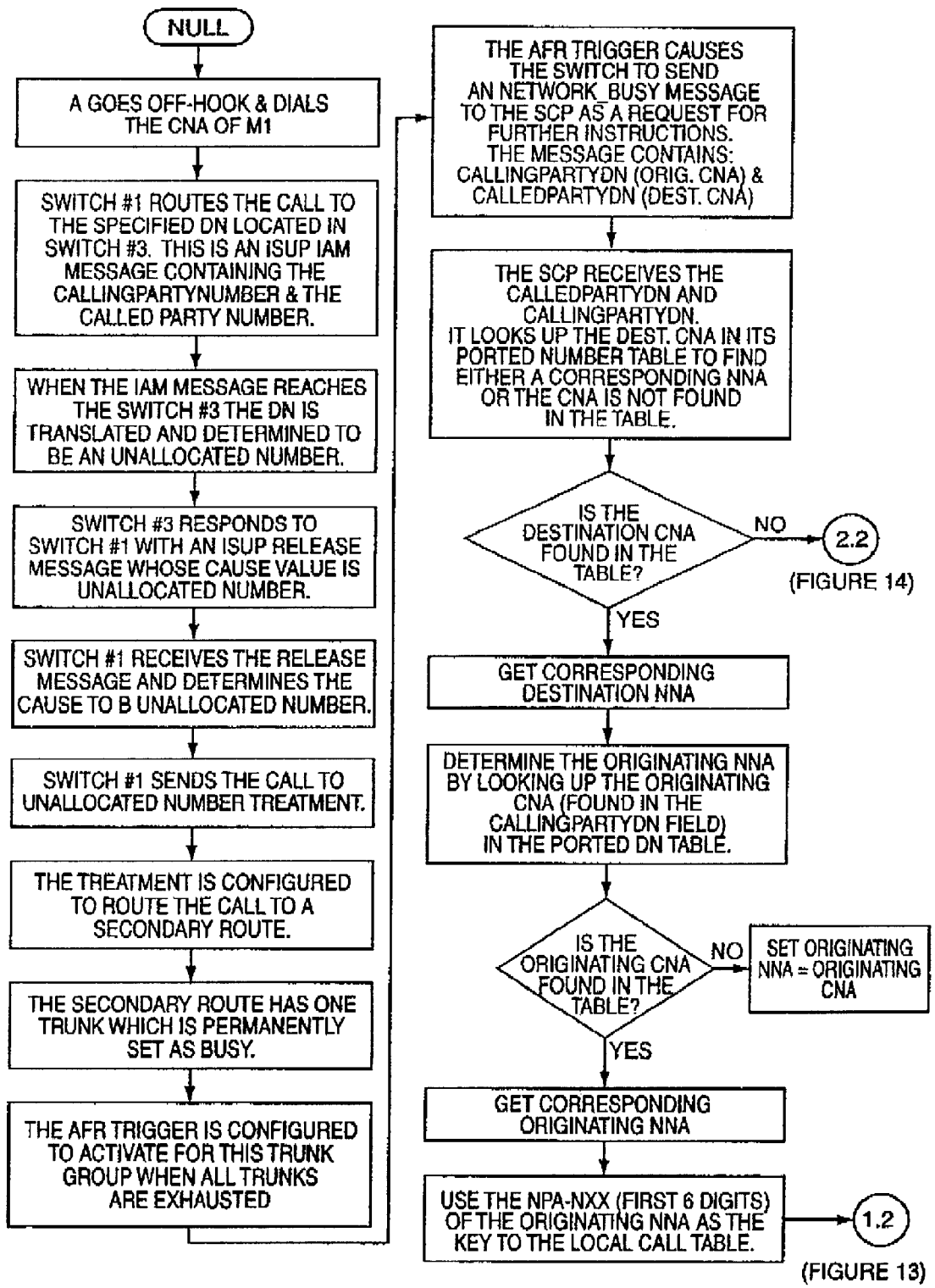
FIGS. 12 to 14 are a flow chart illustrating the steps the system of FIG. 3 implements to effect number portability according to the example shown in FIG. 11.
Figure 13:
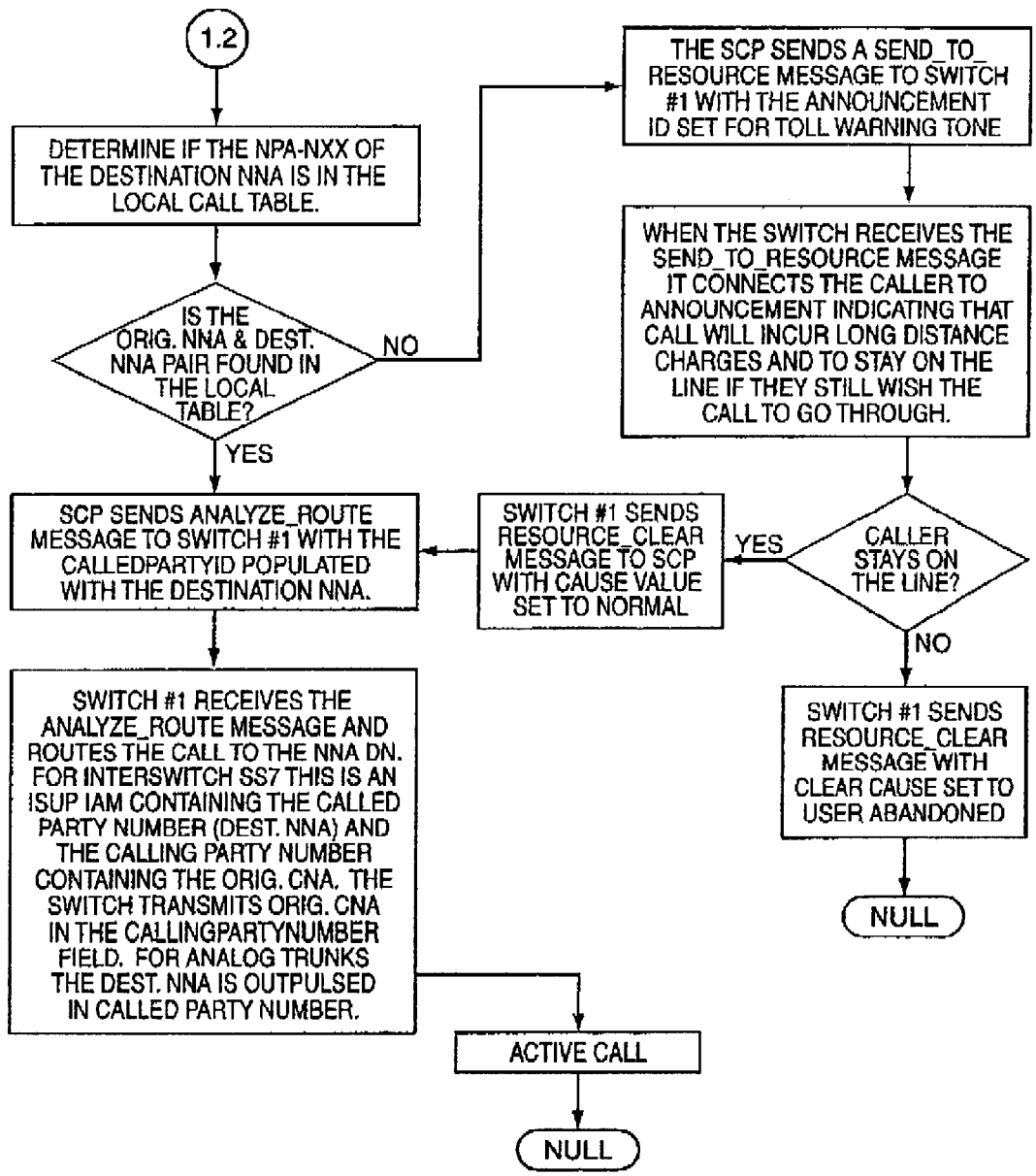
Figure 14:
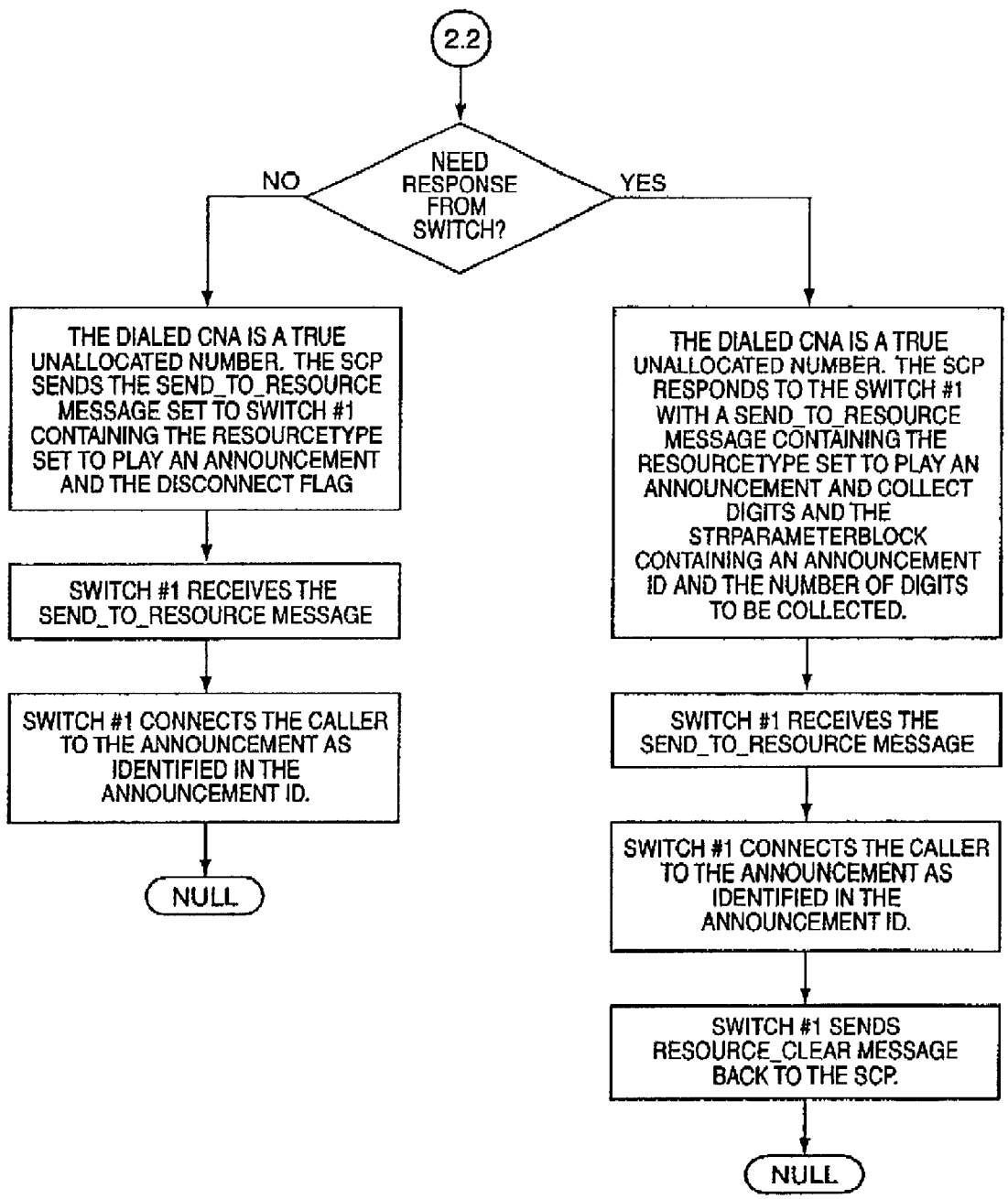
Figure 15:
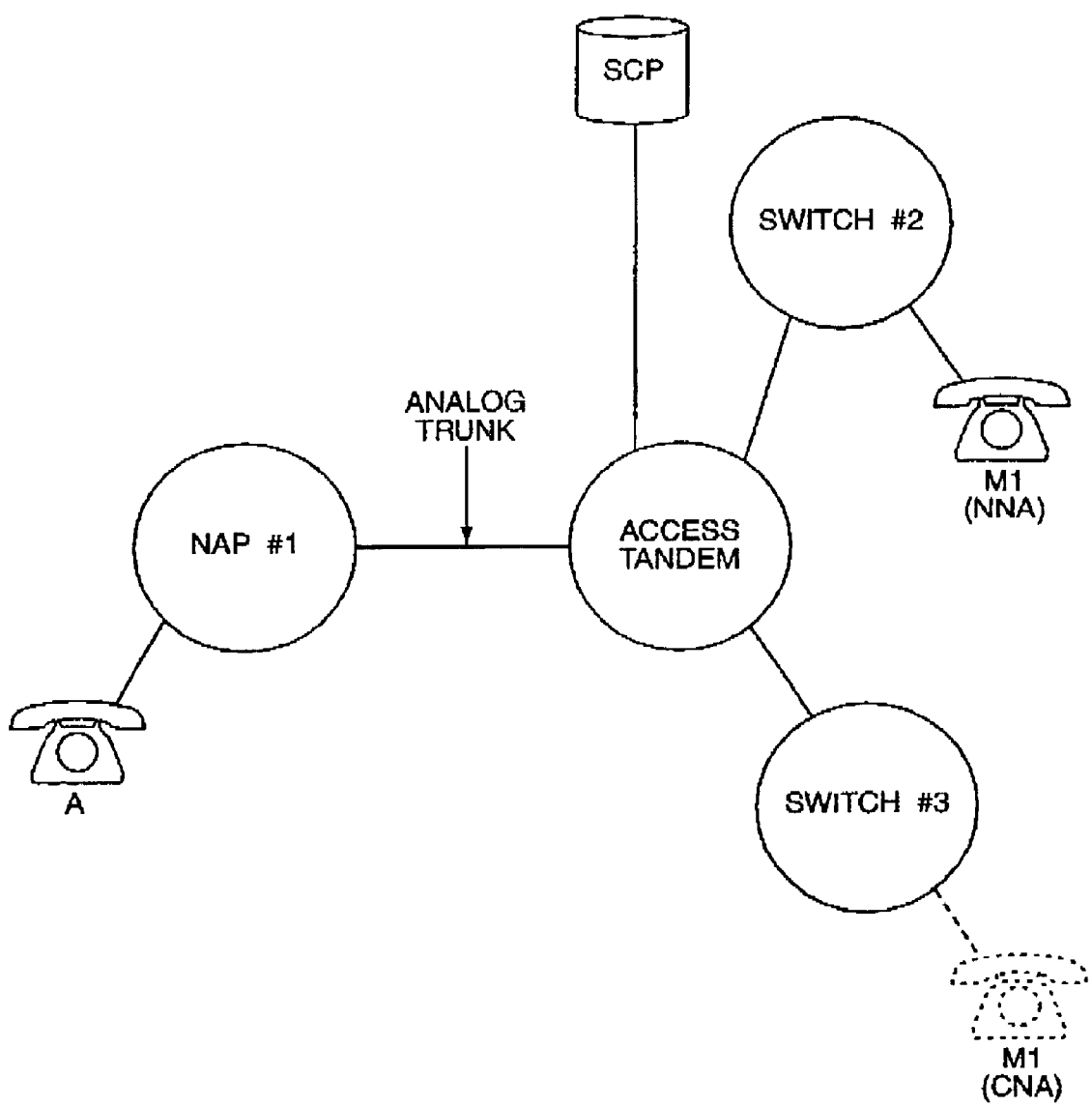
FIG. 15 is a schematized representation useful for explaining the method of operation of the system shown in FIG. 3, where the calling telephone is connected to a network access point (NAP) that is not part of an intelligent network (IN) and accesses the total system by means of analog trunks.
Figure 16:
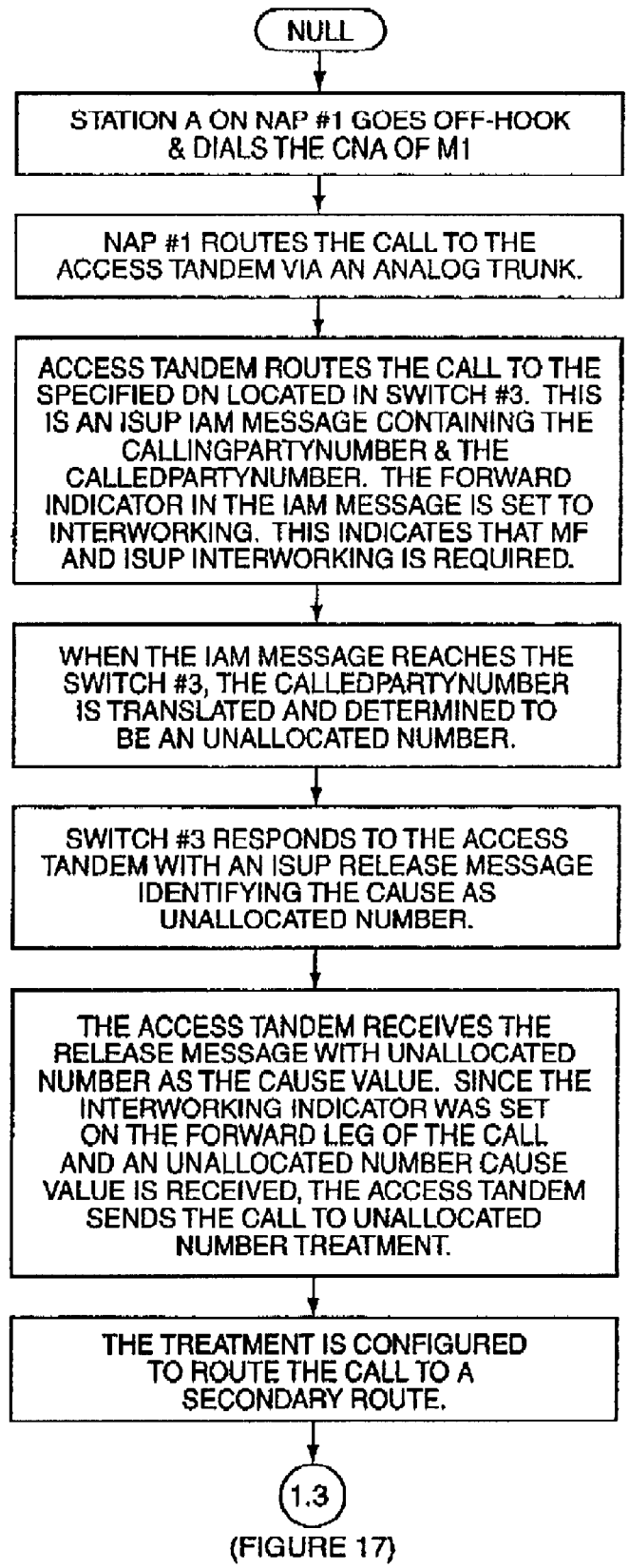
FIGS. 16 to 19 are a flow chart illustrating the steps the system of FIG. 3 implements to effect number portability according to the example shown in FIG. 15.
Figure 17:
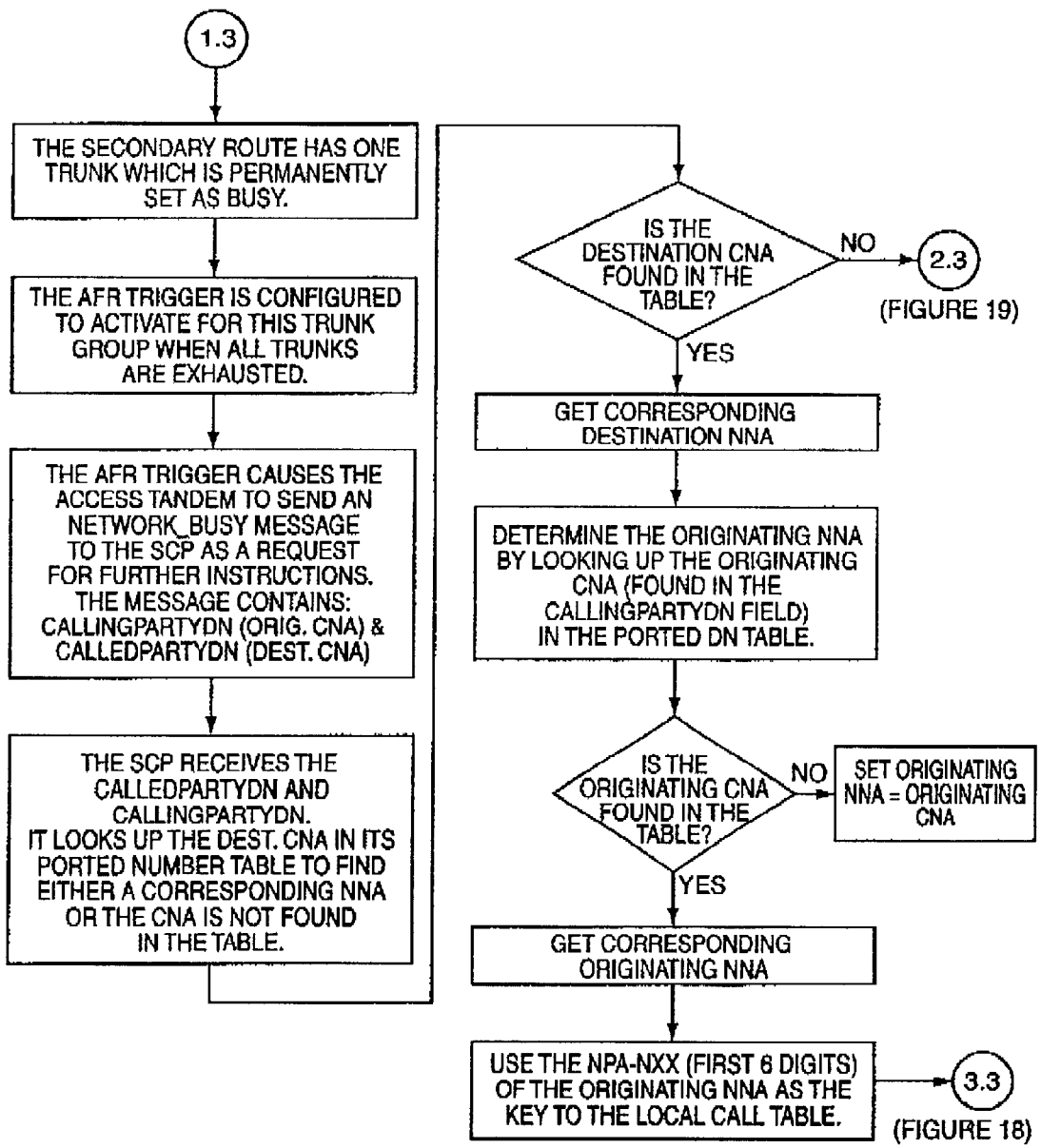
Figure 18:
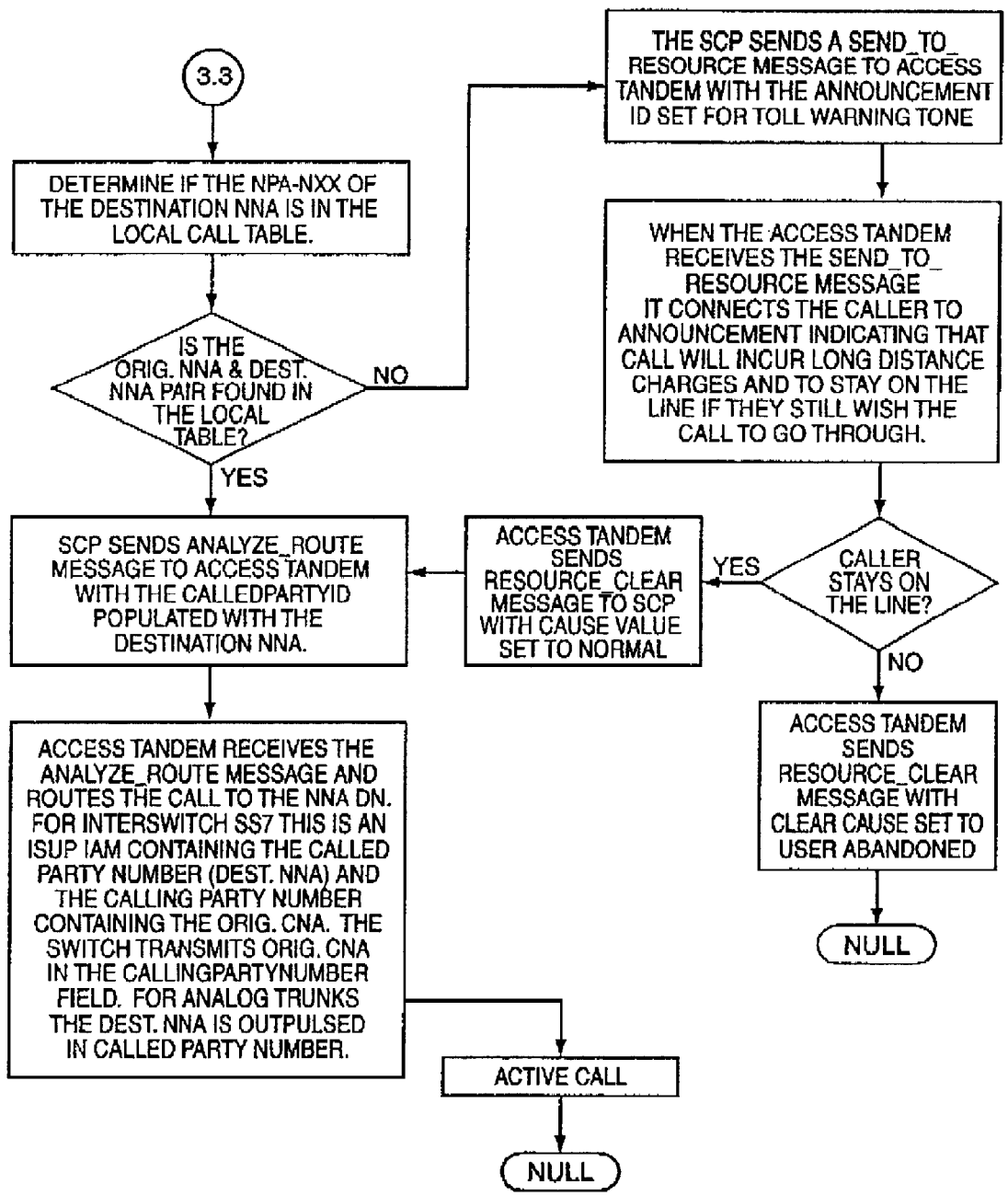
Figure 19:
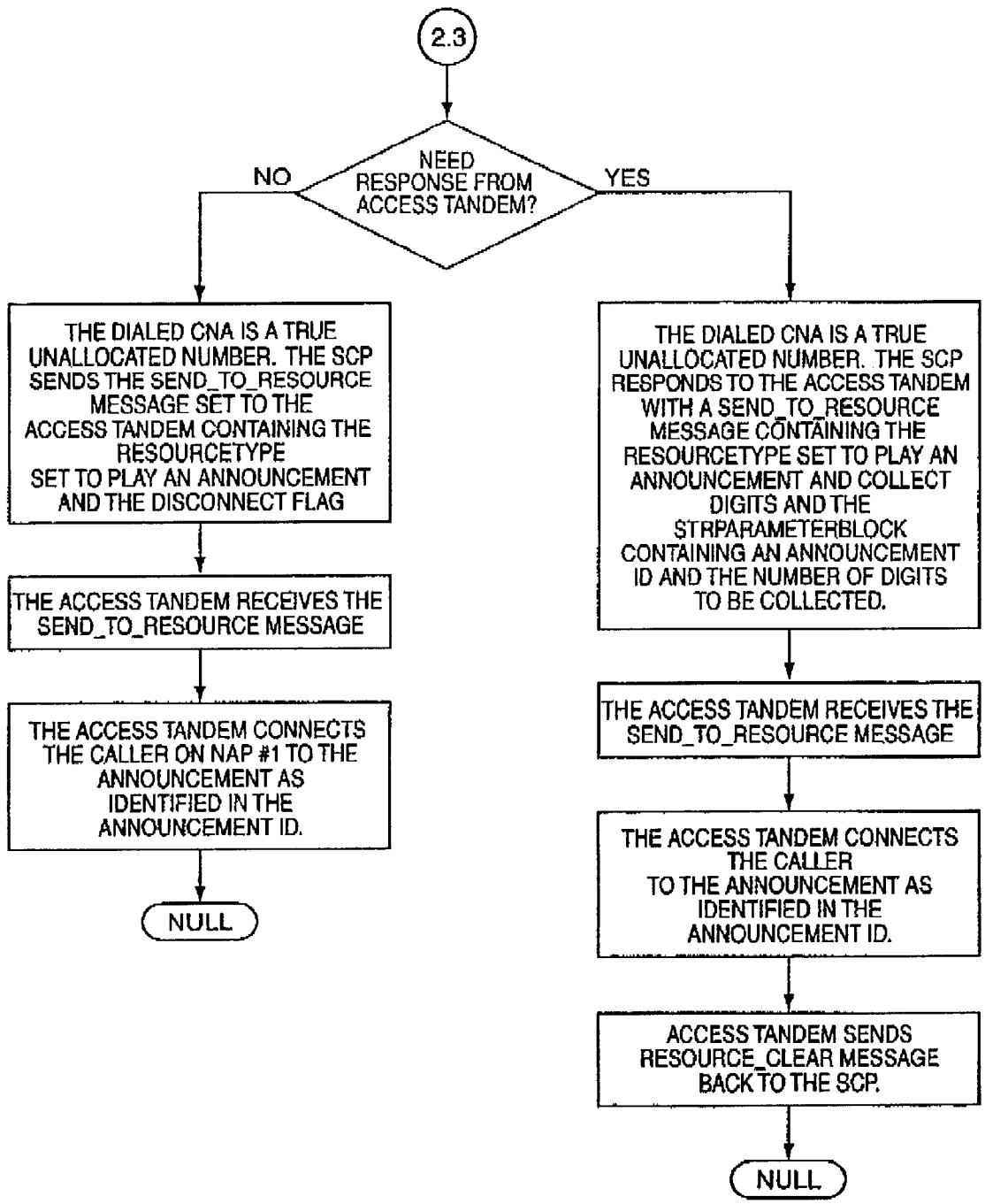

The flow charts of FIGS. 8 to 10 form continuous flow beginning at a "Null" (i.e., start) position and ending there as well. The flow chart boxes 81 to 113 have clear description of the steps taken therein, and there is no reason to repeat them in this text. However, an expanded description of some of the steps taken is given below, due to lack of space in FIGS. 8 to 10, as follows:

82: Other states may be detected such as:
Line Busy
No answer on the Line
Type of Feature set on the Line:
  Voice mail
  Calling Line ID Display
  Selective Call Screening or rejection
  Call Forwarding
  Type of agent: Cellular, PCS, ISDN BRI
  AIN Trigger set on line
  Error condition such as line not working 83: The-secondary route may be chosen on any state as described in note 2 above.

84: The secondary route may be one or more of the following options and can be set on a per switch basis:
  Virtual directory number with a Termination Attempt Trigger set
  Trunk connected to an Intelligent Peripheral
  Trunk connected to an AIN capable switch
  trunk or line to an operator
  Automated Call Distribution Center
  Trunk with Shared Inter-Office trigger set
  Other agents lines or trunks
  Agents (lines or trunks) with other AIN triggers set 96: Other fields in the Network_busy message may be examined to determine other billing information such as: Userid, BearerCapability, ChargeNumber etc.

99: Another option is to send Orig.NNA in the Called Party Number field. This means that lines on the Destination switch with features such as Calling Line ID display will need to have a Termination Attempt Trigger set to launch a query to an SCP to convert Orig.NNA to Orig.CNA or the originator's name etc. The SCP will populate the Calling Line ID or the name of the caller in the Display Text parameter of the Authorize_Termination message sent to the destination switch.

Notes
a) For calls originating from ported numbers (e.g. M1). The option of whether the originator's CNA or NNA is sent is set up by datafill in the switch's memory.
b) Using the Originator's CNA allows features such as Calling Line ID display to work properly without the need for subsequent information from an external database or SCP.

100: An option here is that the SCP may instruct the switch to collect more information (via dialled digits, voice recognition, data stored in a device's memory) from the caller to do other services such as:
  ACCS—Calling Card Number
  Caller chooses to route to called party's voice mail
  Change the caller's routing without the need for the caller to go on-hook.

112: The caller may be offered via announcement different options when he/she have reached a true unallocated number:
  they may redial without hanging up
  the announcement may repeat what digits were dialled so that the caller knows if they have misdialled
  intercept treatment telling them what the new number is.

The following groups of FIGS. 11 to 14 and 15 to 19, likewise illustrate and explain two other ported number scenarios. FIGS. 11 to 14 describe a situation where the calling telephone A and the ported telephone M1 were not originally connected to the same switch, but to two different switches #1 and #3, respectively; and M1 was ported to a switch #2. FIGS. 15 to 19 describe a situation where the calling telephone A is connected to a network access point NAP #1, which a switch that is not an AIN switch, and which is connected to the nearest access tandem switch by means of a analog trunk. As may be seen from FIG. 14 the database is in the SCP attached to the AIN-type access tandem switch, which is the first "intelligent" switch in the chain from the NAP #1, but the SCP could be at the switch #3, where the database "dip" (SCP query) takes place.

Figure 20:
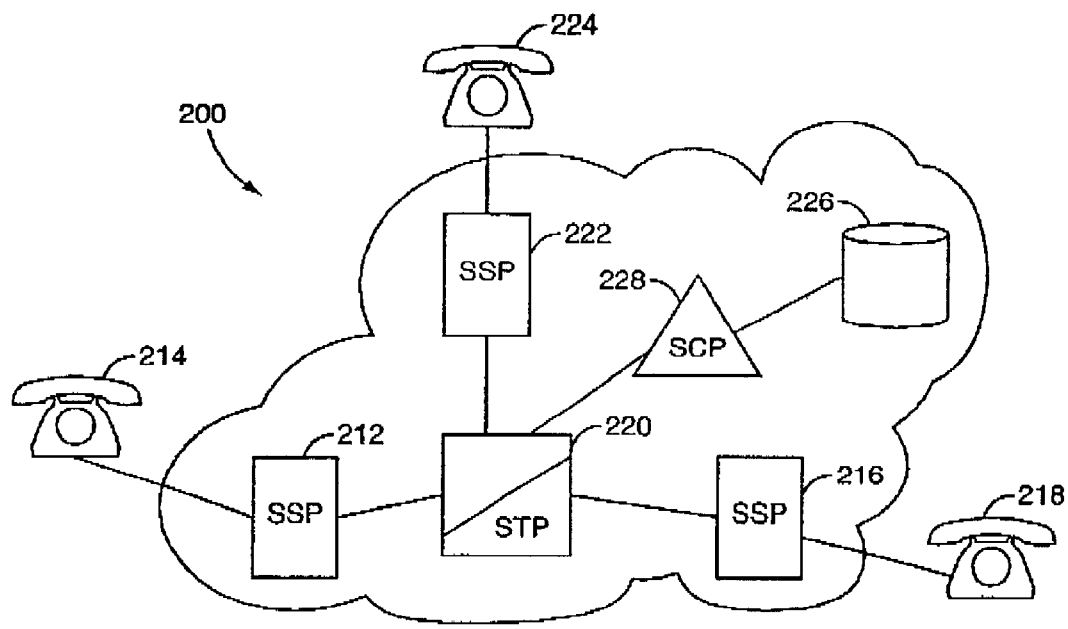
FIG. 20 illustrates in a block diagram a known AIN network implementation of local number portability.

Turning now to FIGS. 20 to 23 of the drawings, they illustrate in future implementation embodiment of the present invention, in the context of an advanced intelligent network AIN 200 generally shown in FIG. 20. The AIN network 200 includes a service switching point (SSP) 212, representing the originating access provider (OAP) for a calling subscriber 214, a second SSP 216, representing the terminating access provider (TAP) for a called subscriber 218 and a signal transfer point (STP) 220. The AIN network 200 also includes a third SSP 222 and a subscriber 224 representing the ported number of the called subscriber 218. To provide local number portability, the AIN network 200 must be able to connect the calling subscriber 214 with the ported subscriber 224.

A number of schemes have been proposed to accommodate this call completion. Most AIN-based schemes involve accessing a database 226 via a service control point (SCP) 228 to obtain the required information with which to complete the call to the ported subscriber.

One suggestion would have the originating access provider SSP 212 make a query to the database 226 for every call. This is impractical as the current CCS7 signalling network could not handle the resultant volume of traffic (or would be too costly) and as the majority of numbers will not be ported in the foreseeable future.

Another suggestion, which attempts to obviate the impracticality of the first scheme, proposes that the originating access providers SSP 212 attempt normal call completion to the terminating access providers SSP 216 as specified by the calling number.

When the SSP 216 determines that the called number has been ported it either a) returns a release message with a cause indicating that the number has been ported, or b) makes a query to a database 226 to determine the address required for completing the call to the subscriber 224 via the SSP 222, representing the ported access providers. In the case of option a), the originating access provider SSP 212 makes the query to the database 226 to determine the address for the ported subscriber 224. In the case of option b) the address is provided to the SSP 212 by the SSP 216.

In the representative AIN network of FIG. 20, this scheme appears to work well, with either option, because there is only one database 226. In a practical system, SSPS 212 and 216 would not likely access the same database, necessitating multiple instances of centralized instances will all of the associated complexities and problems. Implementing a database for ported numbers in addition to the other databases extent in the AIN network would increase operating costs and complexity.

The messages carried on the Signalling System number 7 SS7 network protocol are known as Common Channel Signalling number 7 (CCS7) messages.

CCS7 messages and telephone calls are routed in accordance with information imbedded in CCS7 messages. Two types of CCS7 messages relevant to LNP capability are: the CCS7 ISDN User Part (ISDNUP or ISUP) and the Intelligent Network (IN) Query Message or Package.

CCS7 messages have three parts:
Message Transfer Part (MTP) containing the routing label including the Origination Point Code (OPC) and Destination Point Code (DPC).
Signalling Connection Control Part (SCCP) containing the Global Title information.
Data field containing either
Data for call set-up. The data for call set-up is defined as ISDN User Part (ISDNUP or ISUP) data, or
Data for database services. This data is defined as Transaction Capability Application Part (TCAP) data.

All data packets (or packages) sent across the network must have the originating and terminating port addresses imbedded in the packet header. In the Signalling System number 7 (SS7) terminology these address are called the Originating Point Codes (OPC) and Destination Point Codes (DPC), respectively.

Figure 21:
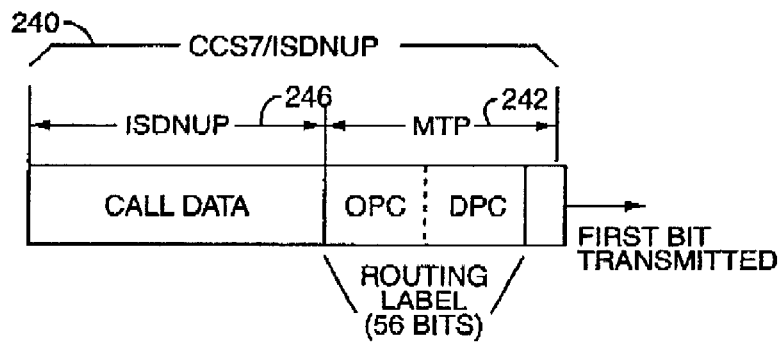
FIG. 21 illustrates a CCS7 ISDNUP (ISUP) message for basic call set-up.

Referring to FIG. 21, there is illustrated a CCS7 ISDNUP/ISUP message for basic call set-up. The CCS7 ISDNUP/ISUP message 240 includes the MTP 242 and the ISDNUP 246. As shown, basic call routing requires the MTP and ISDNUP (or ISUP).

Figure 22:
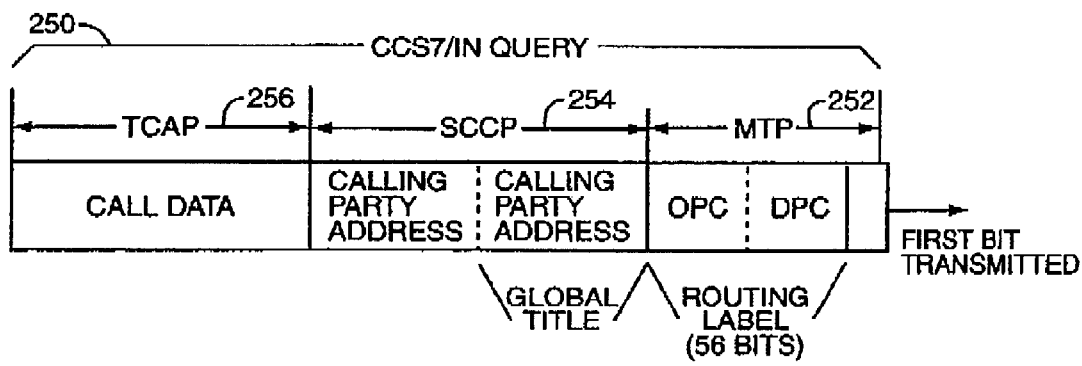
FIG. 22 illustrates a CCS7 (IN query) message.

Referring to FIG. 22, there is illustrated a CCS7 IN query message. The CCS7 IN query message 250 includes the MTP 252, the SCCP 254, and the TCAP 256.

Figure 23:
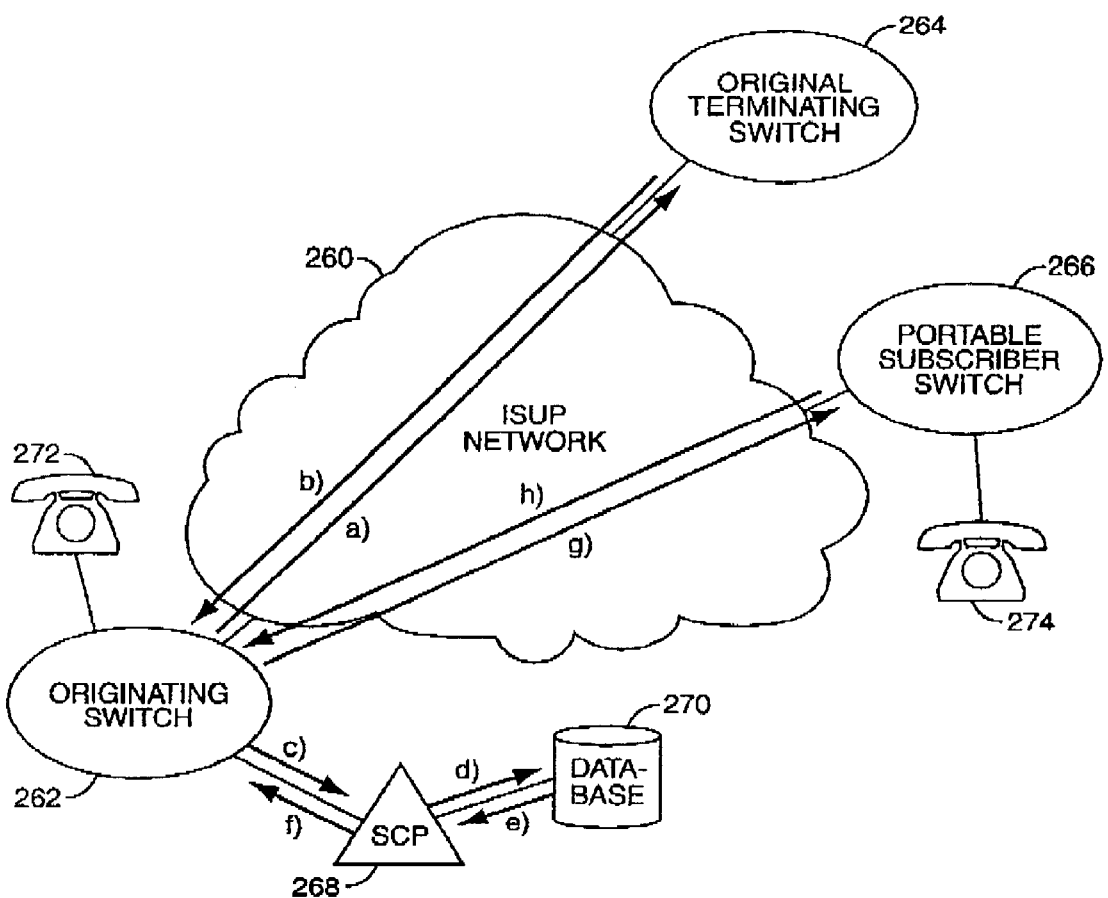
FIG. 23 illustrates a simplified AIN network configured in accordance with an embodiment of the present invention.

Referring to FIG. 23, there is illustrated a simplified AIN network configured in accordance with an embodiment of the present invention. The simplified AIN network is represented by a cloud 260, the originating access provider by originating switch 262, the terminating access provider by original terminating switch 264 and the ported access provider by portable subscriber switch 266. The originating switch 262 is connected to an SCP 268 (via an STP not shown in FIG. 23) which is, in turn, connected to a database 270. Subscribers 272 and 274 are shown connected to the originating switch 262 and the portable subscriber switch 266, respectively.

In operation, when the subscriber 272 attempts to call subscriber 274, whose number resided on the original terminating switch 264, a) the originating switch 262 launches an ISUP call attempt to the original terminating switch 264. Upon receiving the ISUP call attempt, the original terminating switch 264 determines that the called number has been ported. The original terminating switch 264 b) returns a message to the originating switch bearing an indication that the called number has been ported. The originating switch 262 c) queries SCP 268 using a TCAP message to determine the current address of the ported number. The SCP 268 d) requests a look up of the ported number from the automated directory assistance server 270. The automated directory assistance server 270 e) returns the required address information to the SCP 268 and may also provide a recorded announcement if the new address represents a toll call. The SCP 268 f) relays the information to the originating switch 262. The originating switch 262 g) launches an ISUP call attempt to the portable subscriber switch 266 to which the subscriber 274 is now connected. In the case of receiving a recorded announcement, the originating switch first plays the announcement to the calling subscriber 272, then waits for an appropriate response from subscriber 272 prior to launching the ISUP call attempt. The portable subscriber switch 266 completes the call to the subscriber 274 using the addressing information provided in the ISUP call attempt.

What is claimed is:

1. A geographically distributed telephony switching system for providing telephone number portability within said switching system while conserving at least transmission facilities between switching nodes of the system, comprising:
    (a) database means for storing ported telephone numbers and new switching node numbers corresponding thereto; and
    (b) trigger means at least at one switching node for providing a release message with cause to said database means to effect retrieval of a new switching node number corresponding to a ported telephone number.

2. The system as defined in claim 1, wherein said release message indicates one of: a service provider; location portability; and service portability, as it's cause.

3. The system as defined in claim 2, wherein said service provider has access to new routing information which is a local routing number indicating a new node of said IN-type telephone switching system.

4. The system as defined in claim 1, wherein said trigger means further provides new routing information which is a local routing number indicating a new node of said IN-type telephone switching system.

5. The system as defined in claim 1, wherein said release means includes new routing information which is a local routing number indicating a new node of said IN-type telephone switching system.

6. The system as defined in claim 1, wherein said trigger means provides a permanently busied announcement trunk adapted to trigger an automatic flexible routing procedure resident in said at least one switching node.

7. The system as defined in claim 6, further comprising data processing means for inspecting components of said new switching node number to ascertain that connection thereto does not entail long distance charges.

8. A method of operating an intelligent network (IN)-telephone network having a plurality of service switching points (SSPs), at least one service control point (SCP) accessible via a signalling system 7 (SS7) for providing routing information for portable telephone numbers when called, and trigger means at least at one of the plurality of SSPs for querying the at least one SCP to effect retrieval of routing information corresponding to a portable telephone number; comprising the steps of:
    (a) forwarding an Initial Address Message (IAM) from an originating office to a terminating office, said IAM containing the calling party number and called party number to enable said call to reach said terminating office;

(b) receiving said IAM at said terminating office and determining whether said call is directed to a portable number;

(c) returning from said terminating office to said originating office, an Integrated Services Digital Network (ISDN) User Part (ISUP) message containing an indication that the called party number is a portable number, if said call is directed to a portable number;

(d) receiving, at said originating office, said ISUP message;

(e) triggering a Transaction Capabilities Application Part (TCAP) query from said originating office to said SCP if said ISUP message contains an indication that said called party number is a portable number;

(f) launching a query to an intermediate office if the originating office is unable to service the call, to provide a routing option to enable said call to be routed to said called party number;

(g) receiving said routing option at said intermediate office which launched the query;

(h) creating a new IAM to enable the call to reach the called party number; and (i) forwarding a new IAM from said intermediate office to an alternate terminating office associated with said routing option.

9. The method as defined in claim 8, wherein the original terminating switch returns a message to the originating switch bearing an indication that the called number has been ported.

10. The method as defined in claim 9, wherein said indication includes a data field in the ISUP message.

11. In a telephone network switching system having a number of telephone switching offices equipped with SSPs (Service Switching Points) operating with Intelligent Network (IN) application software, the SSPs including trigger means for providing a release message with cause to a remotely located SCP (Service Control Point) adapted to receive, when required, SS7 (Signalling System 7) messages from the SSPs, and including a database means for translating a dialled number to enable the routing of a call on the network, a method of providing number portability for the treatment of calls from a calling party to a specific number of a called party, comprising the steps of:

(a) receiving digits dialled by said calling party at an exchange serving said calling party;

(b) establishing a signalling path from said exchange serving said calling party to a terminating exchange associated with the dialled digits;

(c) receiving an Initial Address Message (IAM) at said terminating exchange and determining whether said call is directed to a portable number;

(d) creating at said terminating office to said originating office, an Integrated Services Digital Network (ISDN) User Part (ISUP) message containing an indication that the called party number is a portable number, if said call is directed to a portable number;

(e) determining whether an intermediate switching office along the signalling path is capable of supporting number portability on a node-by-node basis;

(f) sending said ISUP message from said terminating exchange to said intermediate switching office along said signalling path, if said intermediate switching office is able to service the call;

(g) launching a query to said intermediate switching office if the exchange serving the calling party is unable to service the call, to provide a routing option to enable said call to be routed to said called party;

(h) receiving said routing option at said intermediate switching office which launched the query; and (i) creating a new IAM to enable the call to reach the called party.

12. An intelligent network (IN)-type telephone switching system, including:

(a) database means for storing portable telephone numbers and new routing information corresponding thereto;

(b) trigger means at a node of said IN-type telephone switching system for causing access to said database means for retrieving said new routing information, said trigger means including means for providing a release message with cause to effect retrieval of the new routing information; and (c) means at another node of said IN-type telephone switching system for using said new routing information to connect telephone calls to said portable telephone numbers.

13. The system as defined in claim 12, wherein said release message indicates one of: a service provider; location portability; and service portability, as its cause.

14. The system as defined in claim 13, wherein said new routing information is a local routing number indicating a new node of said IN-type telephone switching system.

15. The system as defined in claim 12, wherein said new routing information is a local routing number indicating a new node of said IN-type telephone switching system.

* * * * *